(12) United States Patent
Shin et al.

(10) Patent No.: US 11,672,026 B2
(45) Date of Patent: Jun. 6, 2023

(54) METHOD AND APPARATUS FOR TRANSMITTING AND RECEIVING SIGNAL IN WIRELESS COMMUNICATION SYSTEM

(71) Applicant: LG Electronics Inc., Seoul (KR)

(72) Inventors: Seokmin Shin, Seoul (KR); Suckchel Yang, Seoul (KR); Joonkui Ahn, Seoul (KR); Hyunsoo Ko, Seoul (KR); Seonwook Kim, Seoul (KR); Jeongsu Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/592,246

(22) Filed: Feb. 3, 2022

(65) Prior Publication Data

US 2022/0159744 A1    May 19, 2022

Related U.S. Application Data

(63) Continuation of application No. PCT/KR2020/013363, filed on Sep. 29, 2020.
(Continued)

(30) Foreign Application Priority Data

Oct. 3, 2019  (KR) .................. 10-2019-0122705
Oct. 4, 2019  (KR) .................. 10-2019-0123412
(Continued)

(51) Int. Cl.
*H04W 74/08*    (2009.01)
*H04L 27/26*    (2006.01)
*H04W 72/044*   (2023.01)

(52) U.S. Cl.
CPC ..... *H04W 74/0841* (2013.01); *H04L 27/2607* (2013.01); *H04W 72/044* (2013.01); *H04W 74/0866* (2013.01)

(58) Field of Classification Search
CPC ......... H04W 74/0841; H04W 74/0866; H04W 74/002; H04W 74/006; H04W 74/0833;
(Continued)

(56) References Cited

U.S. PATENT DOCUMENTS

2019/0116613 A1    4/2019  Abedini et al.
2019/0132882 A1    5/2019  Li et al.
(Continued)

FOREIGN PATENT DOCUMENTS

FR    WO2019050316    *    3/2019
JP    2019004342           1/2019
(Continued)

OTHER PUBLICATIONS

Ericsson, "Procedure for Two-step RACH," R1-1909123, Presented at 3GPP TSG-RAN WG1 Meeting #98, Prague, CZ, Aug. 26-30, 2019, 16 pages.
(Continued)

*Primary Examiner* — Sudesh M Patidar
(74) *Attorney, Agent, or Firm* — Fish & Richardson P.C.

(57) ABSTRACT

In a method and an apparatus for transmitting and receiving a signal in a wireless communication system, according to one embodiment of the present invention, a PRACH is transmitted through a specific RO from among a plurality of ROs on the basis of a selected SSB, wherein a starting RB index of the specific RO may be determined on the basis of: (i) the lowest RB index of an RB set including the specific RO; (ii) a starting RB index of an RO located at the lowest frequency; and (iii) the lowest RB index of an RB set including the RO located at the lowest frequency.

16 Claims, 16 Drawing Sheets

Related U.S. Application Data

(60) Provisional application No. 63/069,687, filed on Aug. 24, 2020, provisional application No. 63/067,863, filed on Aug. 19, 2020, provisional application No. 63/067,292, filed on Aug. 18, 2020, provisional application No. 63/034,969, filed on Jun. 4, 2020.

(30) Foreign Application Priority Data

| | | |
|---|---|---|
| Nov. 8, 2019 | (KR) | 10-2019-0142357 |
| Apr. 8, 2020 | (KR) | 10-2020-0042487 |
| Jun. 4, 2020 | (KR) | 10-2020-0067919 |

(58) Field of Classification Search
CPC ... H04W 72/044; H04W 72/02; H04W 72/04; H04W 72/0446; H04L 27/2607; H04L 27/26025
See application file for complete search history.

(56) References Cited

U.S. PATENT DOCUMENTS

| | | | |
|---|---|---|---|
| 2019/0268946 A1* | 8/2019 | Harada | H04W 72/1289 |
| 2020/0281016 A1* | 9/2020 | Ohara | H04W 74/006 |
| 2020/0281018 A1* | 9/2020 | Li | H04W 74/0833 |
| 2020/0367288 A1* | 11/2020 | Dahlman | H04W 74/0833 |
| 2021/0014694 A1* | 1/2021 | Li | H04W 80/08 |
| 2021/0250986 A1* | 8/2021 | Luo | H04W 74/085 |
| 2021/0282149 A1* | 9/2021 | Zhu | H04W 72/042 |

FOREIGN PATENT DOCUMENTS

| | | | | |
|---|---|---|---|---|
| KR | 20150129061 | | 11/2015 | |
| KR | WO2021015534 | * | 7/2020 | |
| WO | WO2019050316 | | 3/2019 | |
| WO | WO-2019160814 A1 | * | 8/2019 | H04L 1/0026 |

OTHER PUBLICATIONS

Extended European Search Report in European Appln. No. 20873324.6, dated Aug. 8, 2022, 10 pages.
International Search Report in International Appln. No. PCT/KR2020/013363, dated Jan. 22, 2021, 5 pages (with English translation).
LG Electronics, "On four-step RACH procedure," R1-1713131, Presented at 3GPP TSG RAN WG1 Meeting #90, Prague, Czech Republic, Aug. 21-25, 2017, 6 pages.
Huawei & HiSilicon, "Discussion on 2-step RACH procedure," R1-1908034, Presented at 3GPP TSG RAN WG1 Meeting #98, Prague, Czech Republic, Aug. 26-30, 2019, 14 pages.
ZTE & Sanechips, "On the remaining issues of 2-step RACH procedures," R1-1908182, Presented at 3GPP TSG RAN WG1 Meeting #98, Prague, CZ, Aug. 26-30, 2019, 19 pages.
Qualcomm Incorporated, "Procedures for Two-Step RACH," R1-1909240, Presented at 3GPP TSG-RAN WG1 Meeting #98, Prague, Czech Republic, Aug. 26-30, 2019, 15 pages.
Spreadtrum communications, "Discussion on 2-step RACH procedure," R1-1910016, Presented at 3GPP TSG RAN WG1 Meeting #98Bis, Chongqing, China, Oct. 14-20, 2019, 8 pages.
Korean Notice of Allowance in Korean Appln. No. 10-2022-7002584, dated Apr. 7, 2022, 4 pages (with English translation).

* cited by examiner

Carrier aggregation between L-band and U-band

Standalone U-band(s)

An example of new interlace structure with 1 RE gap between consecutive interlaces

METHOD AND APPARATUS FOR TRANSMITTING AND RECEIVING SIGNAL IN WIRELESS COMMUNICATION SYSTEM

CROSS-REFERENCE TO RELATED APPLICATIONS

This application is a continuation of International Application No. PCT/KR2020/013363, filed on Sep. 29, 2020, which claims the benefit of U.S. Provisional Application No. 63/069,687, filed on Aug. 24, 2020, 63/067,863, filed on Aug. 19, 2020, 63/067,292, filed on Aug. 18, 2020, 63/034,969, filed on Jun. 4, 2020, and Korean Application Nos. 10-2020-0067919, filed on Jun. 4, 2020, 10-2020-0042487, filed on Apr. 8, 2020, 10-2019-0142357, filed on Nov. 8, 2019, 10-2019-0123412, filed on Oct. 4, 2019, and 10-2019-0122705, filed on Oct. 3, 2019. The disclosures of the prior applications are incorporated by reference in their entirety.

TECHNICAL FIELD

The present disclosure relates to a method and apparatus for use in a wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

SUMMARY

The object of the present disclosure is to provide a method and apparatus for performing a random access procedure efficiently in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method and apparatus for transmitting and receiving a signal in a wireless communication system.

In one aspect of the present disclosure, provided herein is a method for transmitting and receiving signals by a user equipment (UE) operating in a wireless communication system, including transmitting a physical random access channel (PRACH), and receiving a random access response (RAR) based on the PRACH, wherein the PRACH may be transmitted on a specific RACH occasion (RO) among a plurality of ROs, wherein a starting Resource Block (RB) index of the specific RO may be determined based on (i) a lowest RB index of an RB set including the specific RO, (ii) a starting RB index of an RO positioned at a lowest frequency, and (iii) a lowest RB index of an RB set including the RO positioned at the lowest frequency.

In another aspect of the present disclosure, provided herein is a user equipment (UE) for transmitting and receiving signals in a wireless communication system, including at least one transceiver, at least one processor, and at least one memory operatively coupled to the at least one processor and configured to store instructions that, when executed, cause the at least one processor to perform specific operations, wherein the specific operations may include transmitting a physical random access channel (PRACH), and receiving a random access response (RAR) based on the PRACH, wherein the PRACH may be transmitted on a specific RACH occasion (RO) among a plurality of ROs, wherein a starting Resource Block (RB) index of the specific RO may be determined based on (i) a lowest RB index of an RB set including the specific RO, (ii) a starting RB index of an RO positioned at a lowest frequency, and (iii) a lowest RB index of an RB set including the RO positioned at the lowest frequency.

In another aspect of the present disclosure, provided herein is an apparatus for a user equipment (UE), including at least one processor, and at least one computer memory operatively coupled to the at least one processor and configured to cause, when executed, the at least one processor to perform operations, the operations including transmitting a physical random access channel (PRACH), and receiving a random access response (RAR) based on the PRACH, wherein the PRACH may be transmitted on a specific RACH occasion (RO) among a plurality of ROs, wherein a starting Resource Block (RB) index of the specific RO may be determined based on (i) a lowest RB index of an RB set including the specific RO, (ii) a starting RB index of an RO positioned at a lowest frequency, and (iii) a lowest RB index of an RB set including the RO positioned at the lowest frequency.

In another aspect of the present disclosure, provided herein is a computer-readable storage medium including at least one computer program that causes at least one processor to perform operations, wherein the operations may include transmitting a physical random access channel (PRACH), and receiving a random access response (RAR) based on the PRACH, wherein the PRACH may be transmitted on a specific RACH occasion (RO) among a plurality of ROs, wherein a starting Resource Block (RB) index of the specific RO may be determined based on (i) a lowest RB index of an RB set including the specific RO, (ii) a starting RB index of an RO positioned at a lowest frequency, and (iii) a lowest RB index of an RB set including the RO positioned at the lowest frequency.

In another aspect of the present disclosure, provided herein is a method for transmitting and receiving signals by a base station operating in a wireless communication system, the method including receiving a physical random access channel (PRACH), and transmitting a random access response (RAR) based on the PRACH, wherein the PRACH may be received on a specific RACH occasion (RO) among a plurality of ROs, wherein a starting Resource Block (RB) index of the specific RO may be determined based on (i) a lowest RB index of an RB set including the specific RO, (ii) a starting RB index of an RO positioned at a lowest frequency, and (iii) a lowest RB index of an RB set including the RO positioned at the lowest frequency.

In another aspect of the present disclosure, provided herein is a communication apparatus (a base station) for transmitting and receiving signals in a wireless communication system, including at least one transceiver, at least one processor, and at least one memory operatively coupled to the at least one processor and configured to store instructions that, when executed, cause the at least one processor to perform specific operations, wherein the specific operations may include receiving a physical random access channel (PRACH), and transmitting a random access response (RAR) based on the PRACH, wherein the PRACH may be received on a specific RACH occasion (RO) among a plurality of ROs, wherein a starting Resource Block (RB) index of the specific RO may be determined based on (i) a lowest RB index of an RB set including the specific RO, (ii) a starting RB index of an RO positioned at a lowest frequency, and (iii) a lowest RB index of an RB set including the RO positioned at the lowest frequency.

In the methods and apparatuses, a value of the start RB index of the specific RO may be obtained by adding a value of the lowest RB index of the RB set including the specific RO and an offset value, wherein the offset value may be obtained by subtracting a value of the lowest RB index of the RB set including the RO positioned at the lowest frequency from a value of the starting RB index of the RO positioned at the lowest frequency.

In the methods and apparatuses, the plurality of ROs may be included in uplink RB sets, respectively, one for each of the uplink RB sets.

In the methods and apparatuses, the uplink RB sets may be included in an uplink active Bandwidth Part (BWP).

In the methods and apparatuses, despite UE-specific guard band information for each of the uplink RB sets, the plurality of ROs may be configured on a basis that the respective uplink RB sets are configured based on nominal guard band information.

The communication apparatus may include an autonomous driving vehicle communicable with at least a UE, a network, and another autonomous driving vehicle other than the communication apparatus.

The above-described aspects of the present disclosure are only some of the preferred embodiments of the present disclosure, and various embodiments reflecting the technical features of the present disclosure may be derived and understood from the following detailed description of the present disclosure by those skilled in the art.

According to an embodiment of the present disclosure, a communication apparatus may perform a random access procedure more efficiently in a different way from the prior art.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UNITS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

Figure 1:
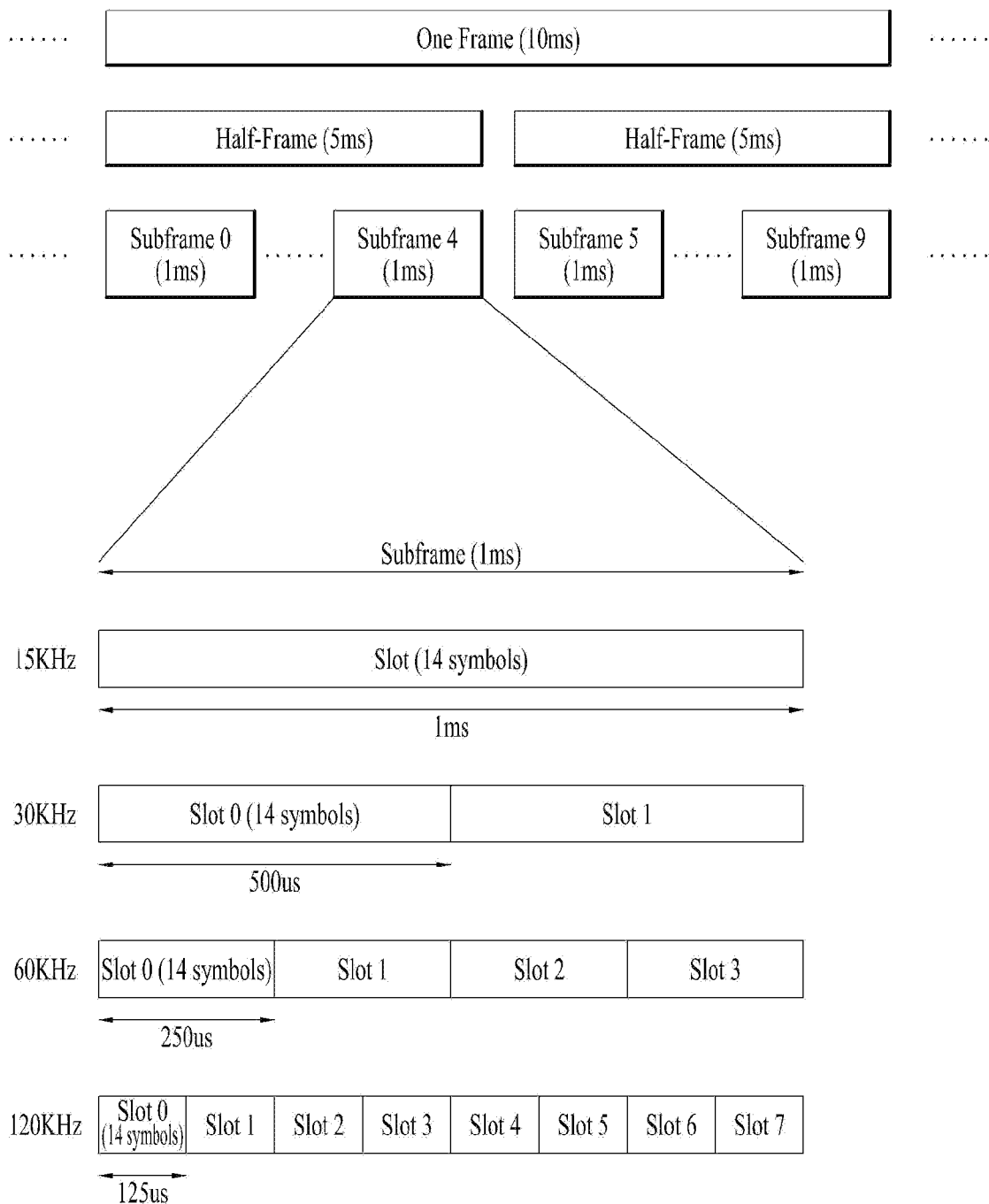
FIG. 1 illustrates a radio frame structure.

3GPP NR
38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification FIG. 1 illustrates a radio frame structure used for NR.
In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15 * 2^u) | $N^{slot}_{symb}$ | $N^{frame,u}_{slot}$ | $N^{subframe,u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

* $N^{slot}_{symb}$: Number of symbols in a slot
* $N^{frame,u}_{slot}$: Number of slots in a frame
* $N^{subframe,u}_{slot}$: Number of slots in a subframe Table 2 illustrates that the number of symbols per slot, the number of slots per frame, and the number of slots per subframe vary according to SCSs in an extended CP case.

TABLE 2

| SCS (15 * 2^u) | $N^{slot}_{symb}$ | $N^{frame,u}_{slot}$ | $N^{subframe,u}_{slot}$ |
|---|---|---|---|
| 60 kHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5th generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 2:
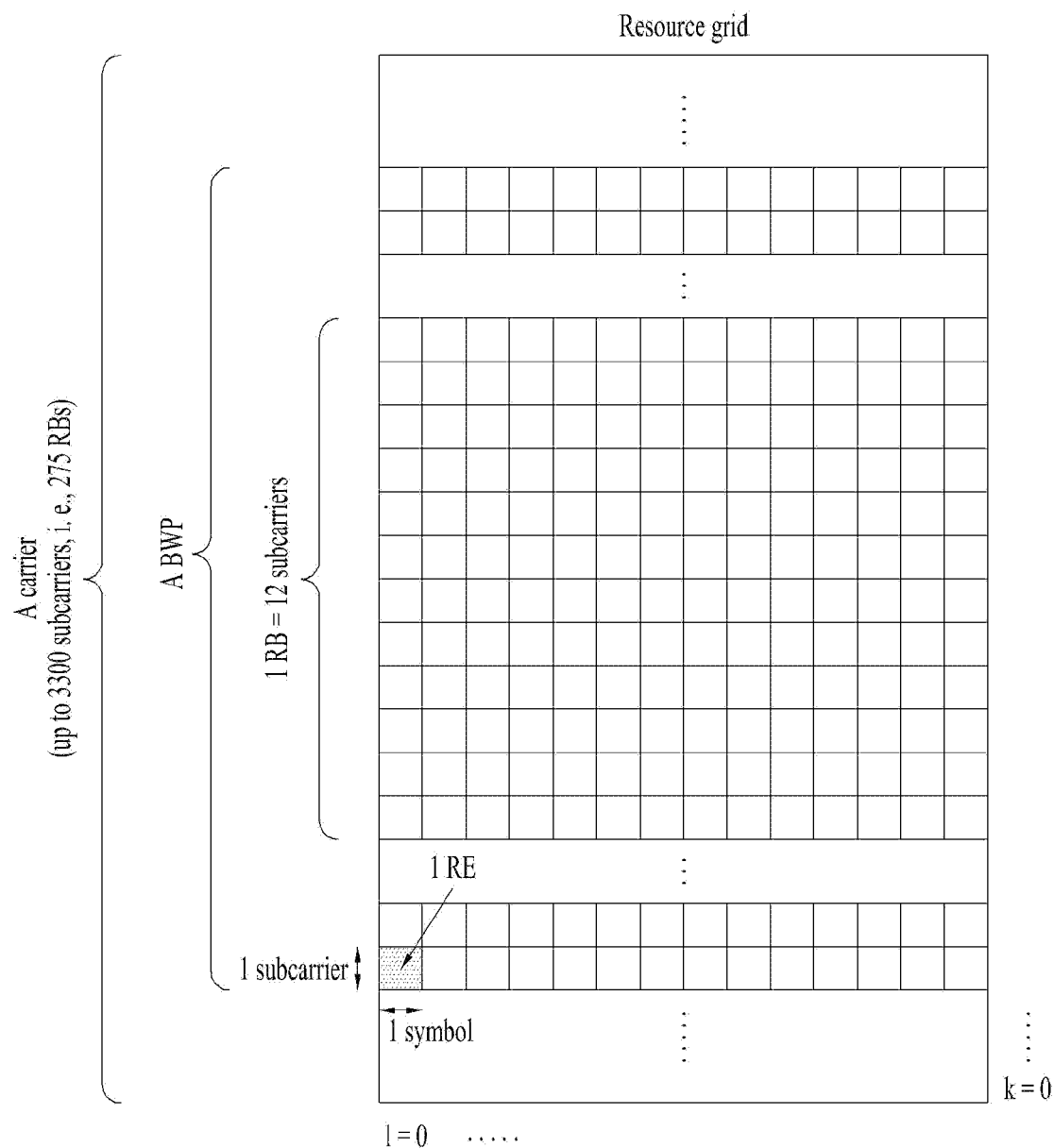
FIG. 2 illustrates a resource grid during the duration of a slot.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain.

A resource block (RB) may be defined by a plurality of (e.g., 12) consecutive subcarriers in the frequency domain. A plurality of RB interlaces (simply, interlaces) may be defined in the frequency domain. Interlace m∈{0, 1, ..., M−1} may be composed of (common) RBs {m, M+m, 2M+m, 3M+m, ....}. M denotes the number of interlaces. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

In a wireless communication system, a UE receives information from a BS in downlink (DL), and the UE transmits information to the BS in uplink (UL). The information exchanged between the BS and UE includes data and various control information, and various physical channels/signals are present depending on the type/usage of the information exchanged therebetween. A physical channel corresponds to a set of resource elements (REs) carrying information originating from higher layers. A physical signal corresponds to a set of REs used by physical layers but does not carry information originating from the higher layers. The higher layers include a medium access control (MAC) layer, a radio link control (RLC) layer, a packet data convergence protocol (PDCP) layer, a radio resource control (RRC) layer, and so on.

DL physical channels include a physical broadcast channel (PBCH), a physical downlink shared channel (PDSCH), and a physical downlink control channel (PDCCH). DL physical signals include a DL reference signal (RS), a primary synchronization signal (PSS), and a secondary synchronization signal (SSS). The DL RS includes a demodulation reference signal (DM-RS), a phase tracking reference signal (PT-RS), and a channel state information reference signal (CSI-RS). UL physical channel include a physical random access channel (PRACH), a physical uplink shared channel (PUSCH), and a physical uplink control channel (PUCCH). UL physical signals include a UL RS. The UL RS includes a DM-RS, a PT-RS, and a sounding reference signal (SRS).

Figure 3:
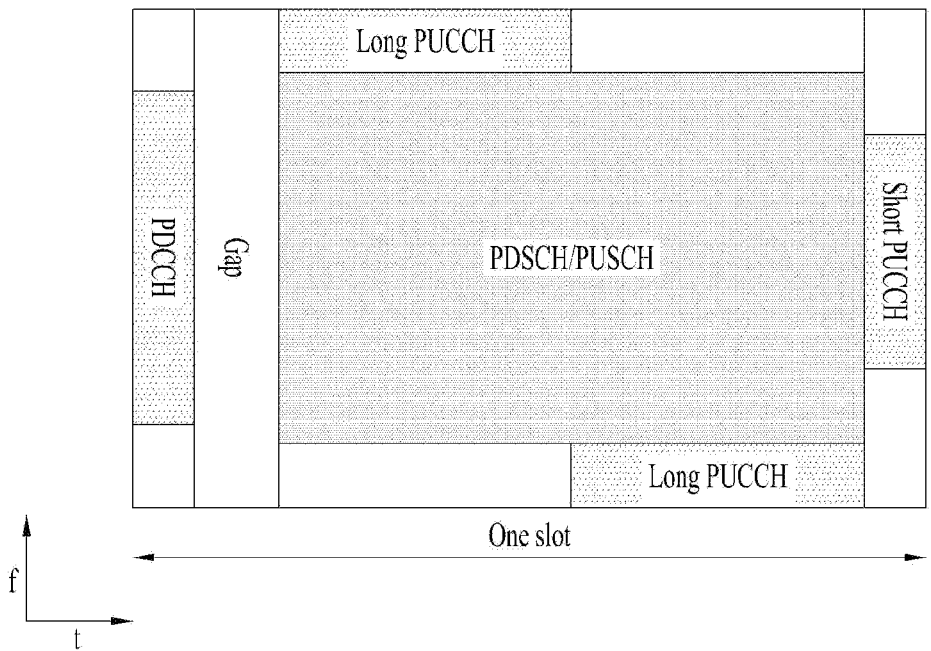
FIG. 3 illustrates a self-contained slot structure.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

In the present disclosure, a base station (BS) may be, for example, a gNode B (gNB).

DL Physical Channel/Signal (1) PDSCH

A PDSCH carries DL data (e.g., DL-shared channel transport block (DL-SCH TB)). The TB is coded into a codeword (CW) and then transmitted after scrambling and modulation processes. The CW includes one or more code blocks (CBs). One or more CBs may be grouped into one code block group (CBG). Depending on the configuration of a cell, the PDSCH may carry up to two CWs. Scrambling and modulation may be performed for each CW, and modulation symbols generated from each CW may be mapped to one or more layers. Each layer may be mapped to resources together with a DMRS after precoding and transmitted on a corresponding antenna port. The PDSCH may be dynamically scheduled by a PDCCH (dynamic scheduling). Alternatively, the PDSCH may be semi-statically scheduled based on higher layer (e.g., RRC) signaling (and/or Layer 1 (L1) signaling (e.g., PDCCH)) (configured scheduling (CS)). Therefore, in the dynamic scheduling, PDSCH transmission is accompanied by the PDCCH, whereas in the CS, PDSCH transmission may not be accompanied by the PDCCH. The CS may include semi-persistent scheduling (SPS).

(2) PDCCH

A PDCCH carries Downlink Control Information (DCI). For example, the PDCCH (i.e., DCI) may carry: transmission formats and resource allocation of a DL-SCH; frequency/time resource allocation information on an uplink shared channel (UL-SCH); paging information on a paging channel (PCH); system information on a DL-SCH; time/frequency resource allocation information on a higher layer control message such as a random access response (RAR) transmitted over a PDSCH; transmit power control commands; and information on activation/deactivation of SPS/CS. Various DCI formats may be provided depending on information in DCI.

Table 4 shows DCI formats transmitted over the PDCCH.

TABLE 4

| DCI format | Usage |
|---|---|
| 0_0 | Scheduling Of PUSCH in one cell |
| 0_1 | Scheduling of one or multiple PUSCH in one cell, or indicating downlink feedback information for configured grant PUSCH (CG-DFI) |
| 1_0 | Scheduling of PDSCH in one cell |
| 1_1 | Scheduling of PDSCH in one cell, and/or triggering one shot HARQ-ACK codebook feedback |
| 2_0 | Notifying a group of UEs of the slot format, available RB sets, COT duration and search space set group switching |

TABLE 4-continued

| DCI format | Usage |
|---|---|
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a CBG-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 may be used to provide dynamic slot format information (e.g., dynamic SFI) to the UE, and DCI format 2_1 may be used to provide downlink pre-emption information to the UE. UEs defined as one group may be provided with DCI format 2_0 and/or DCI format 2_1 over a group common PDCCH, which is a PDCCH defined for a group of UEs.

The PDCCH/DCI may include a cyclic redundancy check (CRC), and the CRC may be masked/scrambled with various identifiers (e.g., radio network temporary identifier (RNTI)) according to the owner or purpose of the PDCCH. For example, if the PDCCH is for a specific UE, the CRC may be masked with a cell-RNTI (C-RNTI). If the PDCCH relates to paging, the CRC may be masked with a paging-RNTI (P-RNTI). If the PDCCH relates to system information (e.g., system information block (SIB)), the CRC may be masked with a system information RNTI (SI-RNTI). If the PDCCH relates to a random access response, the CRC may be masked with a random access-RNTI (RA-RNTI).

Table 5 shows the usage of the PDCCH and transport channels according to the type of RNTI. Here, the transport channel means a transport channel related to data carried by a PDSCH/PUSCH scheduled by the PDCCH.

TABLE 5

| RNTI | Usage | Transport Channel |
|---|---|---|
| P-RNTI | Paging and System Information change notification | PCH(Paging Channel) |
| SI-RNTI | Broadcast of System Information | DL-SCH |
| RA-RNTI | Random Access Response | DL-SCH |
| Temporary C-RNTI | Contention Resolution (when no valid C-RNTI is available) | DL-SCH |
| Temporary C-RNTI | Msg3 transmission | UL-SCH |
| C-RNTI, MCS(Modulation and Coding Scheme)-C-RNTI | Dynamically scheduled unicast transmission | UL-SCH |
| C-RNTI | Dynamically scheduled unicast transmission | DL-SCH |
| MCS-C-RNTI | Dynamically scheduled unicast transmission | DL-SCH |
| C-RNTI | Triggering of PDCCH ordered random access | N/A |
| CS(Configued Scheduling)-RNTI | Configured scheduled unicast transmission (activation, reactivation and retransmission) | DL-SCH, UL-SCH |
| CS-RNTI | Configured scheduled unicast transmission (deactivation) | N/A |
| TPC(Transmit Power Control)-PUCCH-RNTI | PUCCH power control | N/A |
| TPC-PUSCH-RNTI | PUSCH power control | N/A |
| TPC-SRS-RNTI | SRS trigger and power control | N/A |
| INT(Interruption)-RNTI | Indication pre-emption in DL | N/A |
| SFI(Slot Format Indication)-RNTI | Slot Format Indication on the given cell | N/A |

TABLE 5-continued

| RNTI | Usage | Transport Channel |
|---|---|---|
| SP(Semi-persistent)-CSI(Channel State Information)-RNTI | Activation of Semi-persistent CSI reporting on PUSCH | N/A |

For the PDCCH, a fixed modulation scheme may be used (e.g., quadrature phase shift keying (QPSK)). One PDCCH may include 1, 2, 4, 8, or 16 control channel elements (CCEs) depending on the aggregation level (AL). One CCE may include 6 resource element groups (REGs), and one REG may be defined by one OFDMA symbol and one (P)RB.

The PDCCH may be transmitted in a control resource set (CORESET). The CORESET corresponds to a set of physical resources/parameters used to carry the PDCCH/DCI within a BWP. For example, the CORESET may include a set of REGs with a given numerology (e.g., SCS, CP length, etc.). The CORESET may be configured by system information (e.g., MIB) or UE-specific higher layer (e.g., RRC) signaling. For example, the following parameters/information may be used to configure the CORESET. One UE may be configured with one or more CORESETs, and a plurality of CORESETs may overlap in the time/frequency domain.

- controlResourceSetId: this parameter/information indicates the identifier (ID) of the CORESET.
- frequencyDomainResources: this parameter/information indicates frequency-domain resources of the CORESET. The frequency-domain resources may be indicated by a bitmap, and each bit corresponds to an RB group (=6 consecutive RBs). For example, the most significant bit (MSB) of the bitmap corresponds to the first RB group in the BWP. An RB group corresponding to a bit with a value of 1 may be allocated as a frequency-domain resource of the CORESET.
- duration: this parameter/information indicates time-domain resources of the CORESET. The parameter/information duration may indicate the number of consecutive OFDMA symbols included in the CORESET. For example, duration has a value of 1-3.
- cce-REG-MappingType: this parameter/information indicates a CCE-to-REG mapping type. An interleaved type and a non-interleaved type may be supported.
- precoderGranularity: this parameter/information indicates a precoder granularity in the frequency domain.
- tci-StatesPDCCH: this parameter/information indicates information (e.g., TCI-StateID) on a transmission configuration indication (TCI) state for the PDCCH. The TCI state may be used to provide a quasi-co-location (QCL) relationship between DL RS(s) in an RS set (TCI-state) and a PDCCH DMRS port.
- tci-PresentInDCI: this parameter/information indicates whether a TCI field is included in DCI.
- pdcch-DMRS-ScramblingID: this parameter/information indicates information used for initialization of a PDCCH DMRS scrambling sequence.

For PDCCH reception, the UE may monitor (e.g., blind decoding) a set of PDCCH candidates in the CORESET. The PDCCH candidate may mean CCE(s) monitored by the UE for PDCCH reception/detection. PDCCH monitoring may be performed in one or more CORESETs in an active DL BWP on each active cell in which the PDCCH monitoring is configured. The set of PDCCH candidates monitored by the UE may be defined as a PDCCH search space (SS) set.

The SS set may be classified into a common search space (CSS) set or a UE-specific search space (USS) set.

Table 6 shows PDCCH search spaces.

| Search Space | Type | RNTI | Use Case |
|---|---|---|---|
| Type0-PDCCH | Common | SI-RNTI on a primary cell | Broadcast of System Information |
| Type0A-PDCCH | Common | SI-RNTI on a primary cell | Broadcast of System Information |
| Type1-PDCCH | Common | RA-RNTI or TC-RNTI on a primary cell | Msg2, Msg4 in RACH |
| Type2-PDCCH | Common | P-RNTI on a primary cell | Paging System Information change notification |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI or CS-RNTI | Group signaling |
| UE Specific | UE Specific | C-RNTI, MSC-C-RNTI or CS-RNTI | UE signaling (e.g, PDSCH/PUSCH) |

The SS set may be configured by system information (e.g., MIB) or UE-specific higher layer (e.g., RRC) signaling. S (e.g., 10) SS sets or less may be configured in each DL BWP of a serving cell. For example, the following parameters/information may be provided for each SS set.

Each SS set may be associated with one CORESET, and each CORESET configuration may be associated with one or more SS sets.

- searchSpaceId: this parameter/information indicates the ID of the SS set.
- controlResourceSetId: this parameter/information indicates the CORESET associated with the SS set.
- monitoringSlotPeriodicityAndOffset: this parameter/information indicates a PDCCH monitoring periodicity (in a unit of slot) and a PDCCH monitoring offset (in a unit of slot)
- monitoringSymbolsWithinSlot: this parameter/information indicates first OFDMA symbol(s) for PDCCH monitoring in a slot in which the PDCCH monitoring is configured. The first OFDMA symbol(s) are indicated by a bitmap, and each bit corresponds to each OFDMA symbol in the slot. The MSB of the bitmap corresponds to the first OFDM symbol in the slot. OFDMA symbol(s) corresponding to bit(s) with a value of 1 corresponds to the first symbol(s) in the CORESET in the slot.

nrofCandidates: this parameter/information indicates the number of PDCCH candidates (e.g., one of 0, 1, 2, 3, 4, 5, 6, and 8) for each AL (where AL={1, 2, 4, 8, 16}).

searchSpaceType: this parameter/information indicates whether the SS type is the CSS or USS.

DCI format: this parameter/information indicates the DCI format of a PDCCH candidate.

The UE may monitor PDCCH candidates in one or more SS sets in a slot according to the configuration of the CORESET/SS set. An occasion (e.g., time/frequency resource) to monitor PDCCH candidates is defined as a PDCCH (monitoring) occasion. One or more PDCCH (monitoring) occasions may be configured within a slot.

UL Physical Channels/Signals (1) PUSCH

A PUSCH may carry UL data (e.g., uplink shared channel (UL-SCH) transport block (TB)) and/or uplink control information (UCI). The PUSCH may be transmitted based on a cyclic prefix orthogonal frequency division multiplexing (CP-OFDM) waveform or a discrete Fourier transform spread OFDM (DFT-s-OFDM) waveform. When the PUSCH is transmitted based on the DFT-s-OFDM waveform, the UE may transmit the PUSCH by applying transform precoding. For example, when the transform precoding is not allowed (e.g., when the transform precoding is disabled), the UE may transmit the PUSCH based on the CP-OFDM waveform. When the transform precoding is allowed (e.g., when the transform precoding is enabled), the UE may transmit the PUSCH based on the CP-OFDM waveform or DFT-s-OFDM waveform. PUSCH transmission may be dynamically scheduled by a PDCCH (dynamic scheduling) or semi-statically scheduled by higher layer signaling (e.g., RRC signaling) (and/or Layer 1 (L1) signaling (e.g., PDCCH)) (configured scheduling (CS)). Therefore, in the dynamic scheduling, the PUSCH transmission may be associated with the PDCCH, whereas in the CS, the PUSCH transmission may not be associated with the PDCCH. The CS may include PUSCH transmission based on a Type-1 configured grant (CG) and PUSCH transmission based on a Type-2 CG. For the Type-1 CG, all parameters for PUSCH transmission may be signaled by the higher layer. For the Type-2 CG, some parameters for PUSCH transmission may be signaled by higher layers, and the rest may be signaled by the PDCCH. Basically, in the CS, the PUSCH transmission may not be associated with the PDCCH.

(2) PUCCH

A PUCCH may carry UCI. The UCI includes the following information.

Scheduling request (SR): The SR is information used to request a UL-SCH resource.

Hybrid automatic repeat and request acknowledgement) (HARQ-ACK): The HARQ-ACK is a signal in response to reception of a DL signal (e.g., PDSCH, SPS release PDCCH, etc.). The HARQ-ACK response may include positive ACK (ACK), negative ACK (NACK), DTX (Discontinuous Transmission), or NACK/DTX. The HARQ-ACK may be interchangeably used with A/N, ACK/NACK, HARQ-ACK/NACK, and the like. The HARQ-ACK may be generated on a TB/CBG basis.

Channel Status Information (CSI): The CSI is feedback information on a DL channel. The CSI includes a channel quality indicator (CQI), a rank indicator (RI), a precoding matrix indicator (PMI), a precoding type indicator (PTI), and so on.

Table 7 shows PUCCH formats. The PUCCH formats may be classified according to UCI payload sizes/transmission lengths (e.g., the number of symbols included in a PUCCH resource) and/or transmission structures. The PUCCH formats may be classified into short PUCCH formats (PUCCH formats 0 and 2) and long PUCCH formats (PUCCH formats 1, 3, and 4) according to the transmission lengths.

TABLE 7

| PUCCH format | Length in OFDM symbols $N_{symb}^{PUCCH}$ | Number of bits | Usage | Etc |
| --- | --- | --- | --- | --- |
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

(0) PUCCH Format 0 (PF0)

Supportable UCI payload size: up to K bits (e.g., K=2)

Number of OFDM symbols included in one PUCCH: 1 to X symbols (e.g., X=2)

Transmission structure: only a UCI signal is configured with no DM-RS, and a UCI state is transmitted by selecting and transmitting one of a plurality of sequences.

(1) PUCCH Format 1 (PF1)

Supportable UCI payload size: up to K bits (e.g., K=2)

Number of OFDM symbols included in one PUCCH: Y to Z symbols (e.g., Y=4 and Z=14)

Transmission structure: UCI and a DM-RS are configured in different OFDM symbols based on time division multiplexing (TDM). For the UCI, a specific sequence is multiplied by a modulation symbol (e.g., QPSK symbol). A cyclic shift/orthogonal cover code (CS/OCC) is applied to both the UCI and DM-RS to support code division multiplexing (CDM) between multiple PUCCH resources (complying with PUCCH format 1) (in the same RB).

(2) PUCCH Format 2 (PF2)

Supportable UCI payload size: more than K bits (e.g., K=2)

Number of OFDM symbols included in one PUCCH: 1 to X symbols(e.g., X=2)

Transmission structure: UCI and a DMRS (DM-RS) are configured/mapped in/to the same symbol based on frequency division multiplexing (FDM), and encoded UCI bits are transmitted by applying only an inverse fast Fourier transform (IFFT) thereto with no DFT.

(3) PUCCH Format 3 (PF3)

Supportable UCI payload size: more than K bits (e.g., K=2)

Number of OFDM symbols included in one PUCCH: Y to Z symbols (e.g., Y=4 and Z=14)

Transmission structure: UCI and a DMRS are configured/mapped in/to different symbols based on TDM. Encoded UCI bits are transmitted by applying a DFT thereto. To support multiplexing between multiple UEs, an OCC is applied to the UCI, and a CS (or interleaved frequency division multiplexing (IFDM) mapping) is applied to the DM-RS before the DFT.

(4) PUCCH Format 4 (PF4 or F4)
Supportable UCI payload size: more than K bits (e.g., K=2)
Number of OFDM symbols included in one PUCCH: Y to Z symbols (e.g., Y=4 and Z=14)
Transmission structure: UCI and a DMRS are configured/mapped in/to different symbols based on TDM. The DFT is applied to encoded UCI bits with no multiplexing between UEs.

Figure 4:
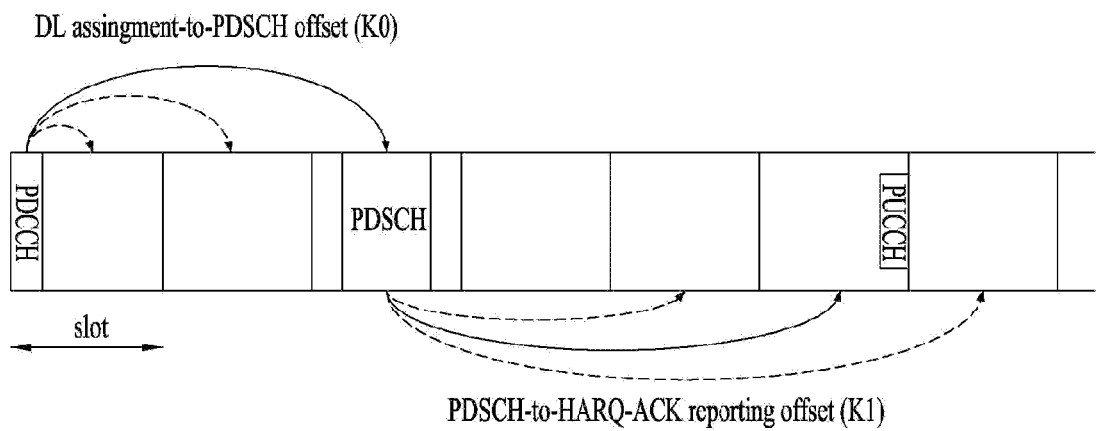
FIG. 4 illustrates an acknowledgment/negative acknowledgment (ACK/NACK) transmission process.

FIG. 4 illustrates an ACK/NACK transmission process. Referring to FIG. 4, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 or DCI format 1_1 may include the following information.

Frequency domain resource assignment: Indicates an RB set assigned to a PDSCH.
Time domain resource assignment: Indicates KG and the starting position (e.g., OFDM symbol index) and length (e.g., the number of OFDM symbols) of the PDSCH in a slot.
PDSCH-to-HARQ_feedback timing indicator: Indicates K1.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

1. Wireless Communication System Supporting Unlicensed Band

Figure 5A:
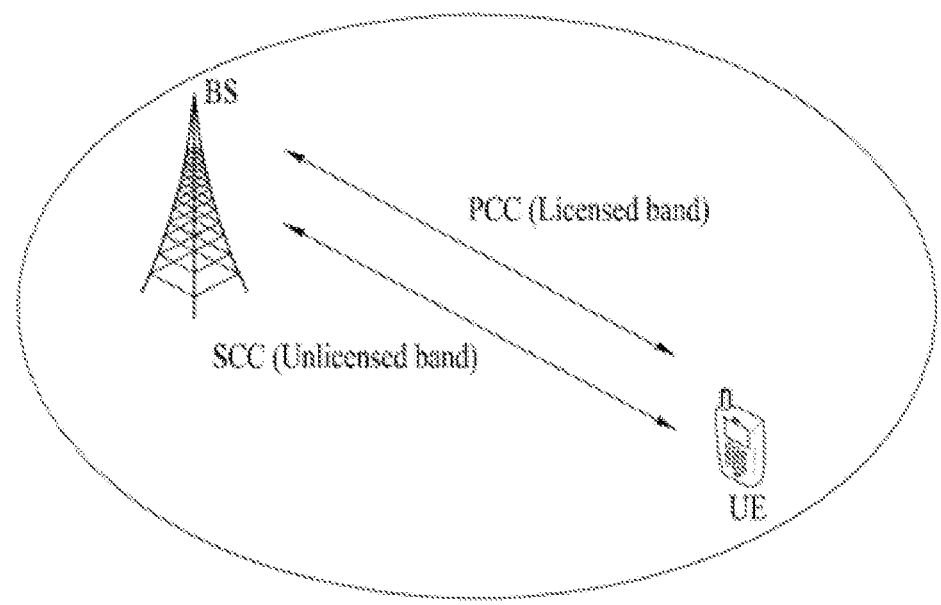
FIGS. 5A and 5B illustrate a wireless communication system supporting an unlicensed band.
Figure 5B:
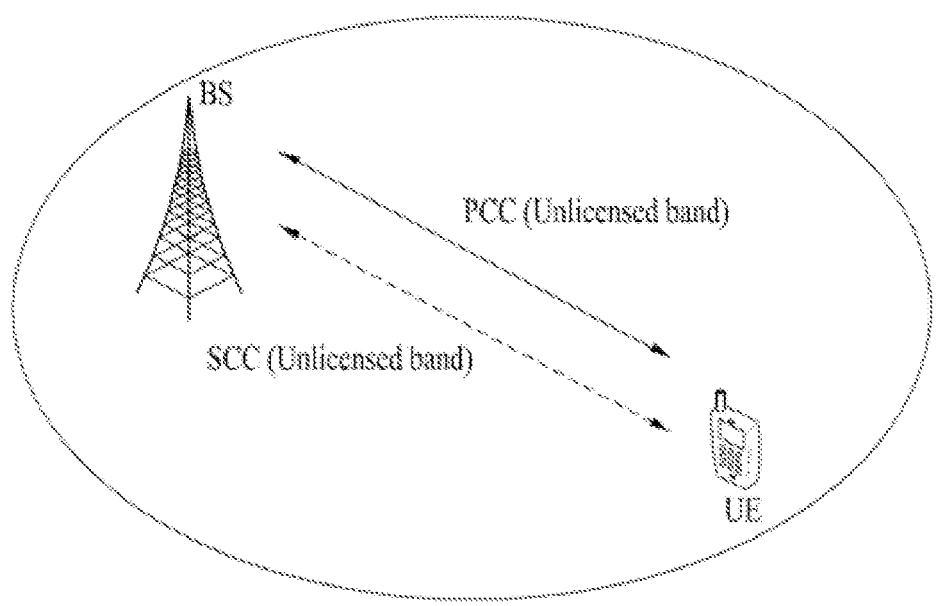

FIGS. 5A and 5B illustrate an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 5A, the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 5B. In other words, the BS and UE may transmit and receive signals only on UCC(s) without using any LCC. For an SA operation, PRACH, PUCCH, PUSCH, and SRS transmissions may be supported on a UCell.

Signal transmission and reception operations in an unlicensed band as described in the present disclosure may be applied to the afore-mentioned deployment scenarios (unless specified otherwise).

Unless otherwise noted, the definitions below are applicable to the following terminologies used in the present disclosure.

Channel: a carrier or a part of a carrier composed of a contiguous set of RBs in which a channel access procedure (CAP) is performed in a shared spectrum.
Channel access procedure (CAP): a procedure of assessing channel availability based on sensing before signal transmission in order to determine whether other communication node(s) are using a channel. A basic sensing unit is a sensing slot with a duration of $T_{sl}$=9us. The BS or the UE senses the slot during a sensing slot duration. When power detected for at least 4us within the sensing slot duration is less than an energy detection threshold $X_{thresh}$, the sensing slot duration $T_{sl}$ is be considered to be idle. Otherwise, the sensing slot duration $T_{sl}$ is considered to be busy. CAP may also be called listen before talk (LBT).
Channel occupancy: transmission(s) on channel(s) from the BS/UE after a CAP.
Channel occupancy time (COT): a total time during which the BS/UE and any BS/UE(s) sharing channel occupancy performs transmission(s) on a channel after a CAP. Regarding COT determination, if a transmission gap is less than or equal to 25us, the gap duration may be counted in a COT. The COT may be shared for transmission between the BS and corresponding UE(s).
DL transmission burst: a set of transmissions without any gap greater than 16 us from the BS. Transmissions from the BS, which are separated by a gap exceeding 16 us are considered as separate DL transmission bursts. The BS may perform transmission(s) after a gap without sensing channel availability within a DL transmission burst.
UL transmission burst: a set of transmissions without any gap greater than 16us from the UE. Transmissions from the UE, which are separated by a gap exceeding 16 us are considered as separate UL transmission bursts. The UE may perform transmission(s) after a gap without sensing channel availability within a DL transmission burst.
Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

Figure 6:
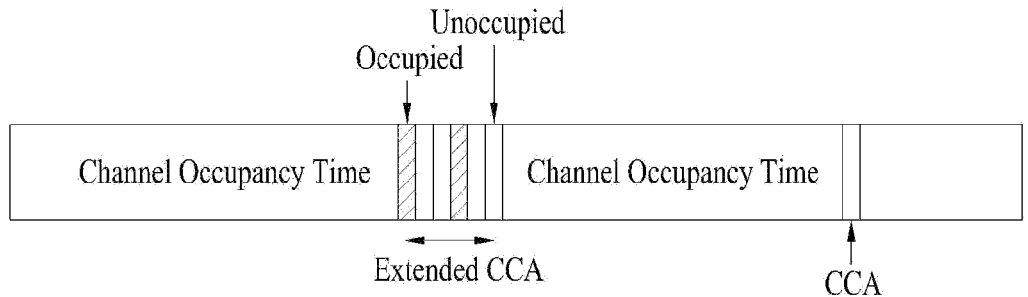
FIG. 6 illustrates an exemplary method of occupying resources in an unlicensed band.

FIG. 6 illustrates a resource occupancy method in a U-band. According to regional regulations for U-bands, a communication node in the U-band needs to determine whether a channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), the communication node may determine that the channel is busy if the detected channel energy is higher than the CCA threshold. Otherwise, the communication node may determine that the channel is idle. The Wi-Fi standard (802.1 lac) specifies a CCA threshold of −62 dBm for non-Wi-Fi signals and a CCA threshold of −82 dBm for Wi-Fi signals. When it is determined that the channel is idle, the communication node may start the signal transmission in a UCell. The sires of processes described above may be referred to as Listen-Before-Talk (LBT) or a channel access procedure (CAP). The LBT, CAP, and CCA may be interchangeably used in this document.

Specifically, for DL reception/UL transmission in a U-band, at least one of the following CAP methods to be described below may be employed in a wireless communication system according to the present disclosure.

DL Signal Transmission Method in U-Band

The BS may perform one of the following U-band access procedures (e.g., CAPs) for DL signal transmission in a U-band.

(1) Type 1 DL CAP Method

In the Type 1 DL CAP, the length of a time duration spanned by sensing slots sensed to be idle before transmission(s) may be random. The Type 1 DL CAP may be applied to the following transmissions:

Transmission(s) initiated by the BS including (i) a unicast PDSCH with user plane data or (ii) a unicast PDCCH scheduling user plane data in addition to the unicast PDSCH with user plane data, or Transmission(s) initiated by the BS including (i) a discovery burst only or (ii) a discovery burst multiplexed with non-unicast information.

Figure 7:
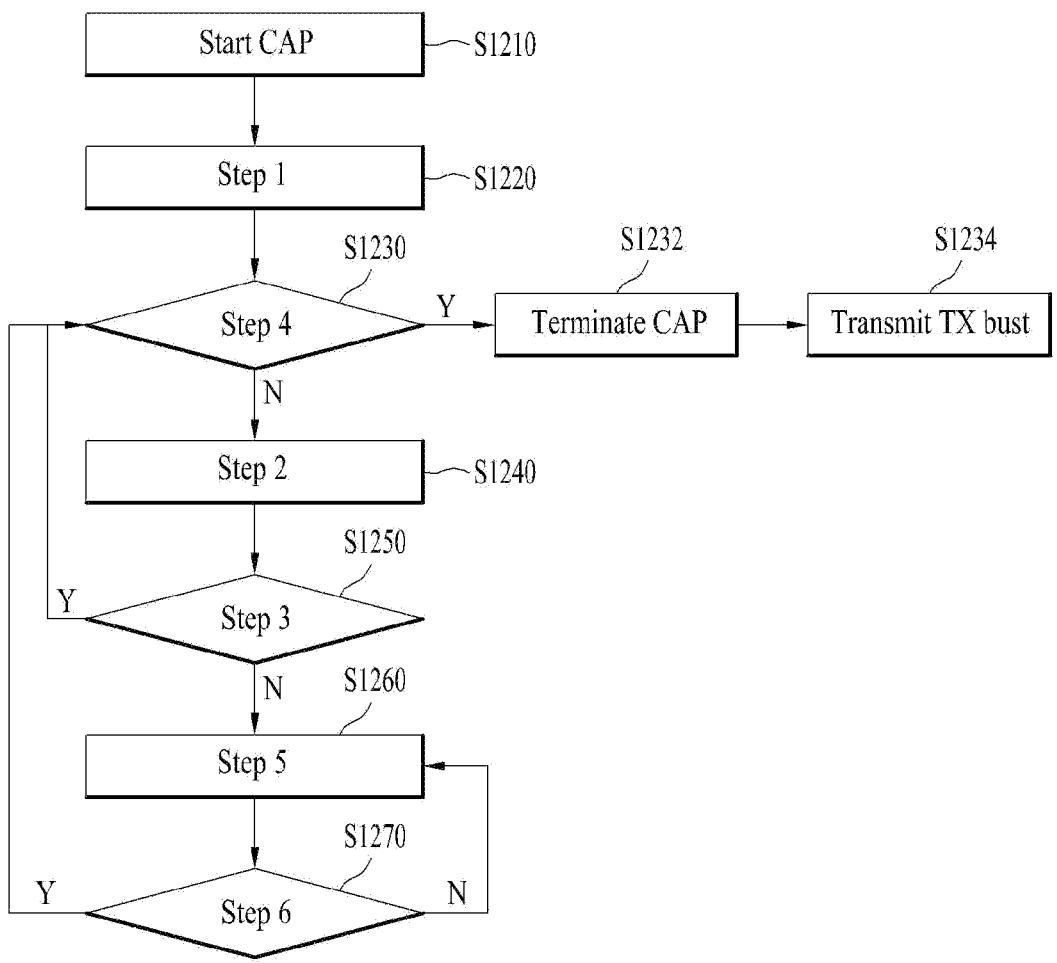
FIGS. 7 and 8 are flowcharts illustrating channel access procedures (CAPs) for signal transmission in an unlicensed band.

FIG. 7 is a flowchart illustrating CAP operations performed by a BS to transmit a DL signal in a U-band.

Referring to FIG. 7, the BS may sense whether a channel is idle for sensing slot durations of a defer duration $T_d$. Then, if a counter N is zero, the BS may perform transmission (S1234). In this case, the BS may adjust the counter N by sensing the channel for additional sensing slot duration(s) according to the following steps when the BS starts the CAP operation (S1210):

Step 1) (S1220) The BS sets N to $N_{init}$ (N=$N_{init}$), where $N_{init}$ is a random number uniformly distributed between 0 and $CW_p$. Then, step 4 proceeds.

Step 2) (S1240) If N>0 and the BS determines to decrease the counter, the BS sets N to N−1 (N=N−1).

Step 3) (S1250) The BS senses the channel for the additional sensing slot duration. If the additional sensing slot duration is idle (Y), step 4 proceeds. Otherwise (N), step 5 proceeds.

Step 4) (S1230) If N=0 (Y), the BS terminates the CAP (S1232). Otherwise (N), step 2 proceeds.

Step 5) (S1260) The BS senses the channel until either a busy sensing slot is detected within an additional defer duration Td or all the slots of the additional defer duration Td are detected to be idle.

Step 6) (S1270) If the channel is sensed to be idle for all the slot durations of the additional defer duration $T_d$ (Y), step 4 proceeds. Otherwise (N), step 5 proceeds.

Table 8 shows that $m_p$, a minimum contention window (CW), a maximum CW, a maximum channel occupancy time (MCOT), and an allowed CW size, which are applied to the CAP, vary depending on channel access priority classes.

TABLE 8

| Channel Access Priority Class (p) | $m_p$ | $CW_{min,p}$ | $CW_{max,p}$ | $T_{mcotp}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

TABLE 8-continued

The defer duration Td is configured in the following order: duration $T_f$ (16 us)+$m_p$ consecutive sensing slot durations $T_{sl}$ (9 us). $T_f$ includes the sensing slot duration $T_{sl}$ at the beginning of the 16-us duration.

The following relationship is satisfied: $CW_{min,p}<=CW_p<=CW_{max,p}$. $CW_p$ may be initially configured by $CW_p=CW_{min,p}$ and updated before step 1 based on HARQ-ACK feedback (e.g., ACK or NACK) for a previous DL burst (e.g., PDSCH) (CW size update). For example, CW, may be initialized to $CW_{min,p}$ based on the HARQ-ACK feedback for the previous DL burst. Alternatively, $CW_p$ may be increased to the next highest allowed value or maintained as it is.

(2) Type 2 DL CAP Method

In the Type 2 DL CAP, the length of a time duration spanned by sensing slots sensed to be idle before transmission(s) may be determined. The Type 2 DL CAP is classified into Type 2A/2B/2C DL CAPs.

The Type 2A DL CAP may be applied to the following transmissions. In the Type 2A DL CAP, the BS may perform transmission immediately after the channel is sensed to be idle at least for a sensing duration $T_{short\_dl}$=25 us. Here, $T_{short\_dl}$ includes the duration $T_f$ (=16us) and one sensing slot duration immediately after the duration $T_f$, where the duration $T_f$ includes a sensing slot at the beginning thereof.

Transmission(s) initiated by the BS including (i) a discovery burst only or (ii) a discovery burst multiplexed with non-unicast information, or Transmission(s) by the BS after a gap of 25 us from transmission(s) by the UE within a shared channel occupancy.

The Type 2B DL CAP is applicable to transmission(s) performed by the BS after a gap of 16 us from transmission(s) by the UE within a shared channel occupancy time. In the Type 2B DL CAP, the BS may perform transmission immediately after the channel is sensed to be idle for $T_f$=16us. $T_f$ includes a sensing slot within 9 us from the end of the duration. The Type 2C DL CAP is applicable to transmission(s) performed by the BS after a maximum of 16 us from transmission(s) by the UE within the shared channel occupancy time. In the Type 2C DL CAP, the BS does not perform channel sensing before performing transmission.

UL Signal Transmission Method in U-Band

The UE may perform a Type 1 or Type 2 CAP for UL signal transmission in a U-band. In general, the UE may perform the CAP (e.g., Type 1 or Type 2) configured by the BS for UL signal transmission. For example, a UL grant scheduling PUSCH transmission (e.g., DCI formats 0_0 and 0_1) may include CAP type indication information for the UE.

(1) Type 1 UL CAP Method

In the Type 1 UL CAP, the length of a time duration spanned by sensing slots sensed to be idle before transmission(s) is random. The Type 1 UL CAP may be applied to the following transmissions.

PUSCH/SRS transmission(s) scheduled and/or configured by the BS

PUCCH transmission(s) scheduled and/or configured by the BS

Transmission(s) related to a Random Access Procedure (RAP)

Figure 8:
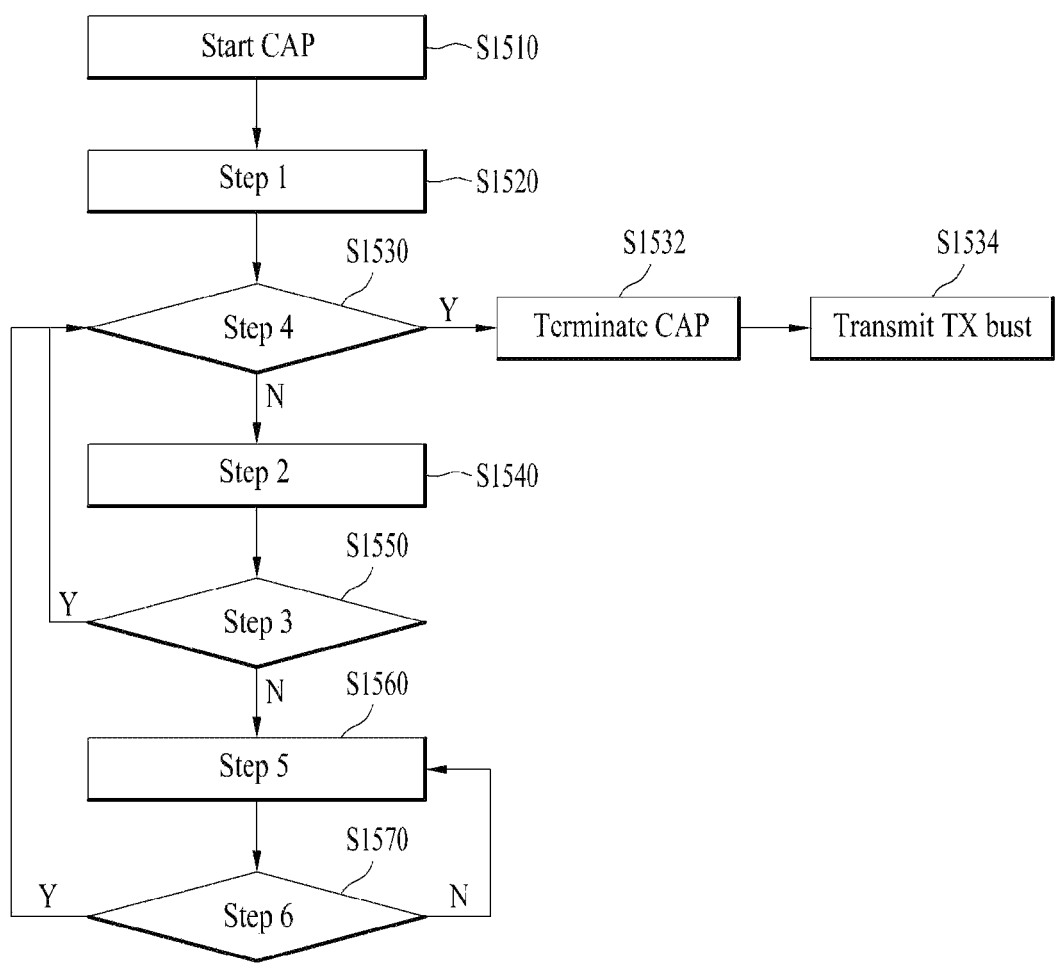

FIG. 8 is a flowchart illustrating CAP operations performed by a UE to transmit a UL signal.

Referring to FIG. 8, the UE may sense whether a channel is idle for sensing slot durations of a defer duration $T_d$. Then, if a counter N is zero, the UE may perform transmission (S1534). In this case, the UE may adjust the counter N by sensing the channel for additional sensing slot duration(s) according to the following steps when the UE starts the CAP operation (S1510):

Step 1) (S1520) The UE sets N to $N_{init}$ (N=$N_{init}$), where $N_{init}$ is a random number uniformly distributed between 0 and $CW_p$. Then, step 4 proceeds.

Step 2) (S1540) If N>0 and the UE determines to decrease the counter, the UE sets N to N−1 (N=N−1).

Step 3) (S1550) The UE senses the channel for the additional sensing slot duration. If the additional sensing slot duration is idle (Y), step 4 proceeds. Otherwise (N), step 5 proceeds.

Step 4) (S1530) If N=0 (Y), the UE terminates the CAP (S1532). Otherwise (N), step 2 proceeds.

Step 5) (S1560) The UE senses the channel until either a busy sensing slot is detected within an additional defer duration Td or all the slots of the additional defer duration Td are detected to be idle.

Step 6) (S1570) If the channel is sensed to be idle for all the slot durations of the additional defer duration $T_d$ (Y), step 4 proceeds. Otherwise (N), step 5 proceeds.

Table 9 shows that $m_p$, a minimum CW, a maximum CW, an MCOT, and an allowed CW size, which are applied to the CAP, vary depending on channel access priority classes.

TABLE 9

| Channel Access Priority Class (p) | $m_p$ | $CW_{min,p}$ | $CW_{max,p}$ | $T_{u/mcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

The defer duration $T_d$ is configured in the following order: duration $T_f$(16 us)+$m_p$ consecutive sensing slot durations $T_{sl}$ (9 us). $T_f$ includes the sensing slot duration $T_{sl}$ at the beginning of the 16-us duration.

The following relationship is satisfied: $CW_{min,p}<=CW, <=CW_{max,p}$. $CW_p$ may be initially configured by $CW_p=CW_{min,p}$ and updated before step 1 based on an explicit/implicit reception response for a previous UL burst (e.g., PUSCH) (CW size update). For example, $CW_p$ may be initialized to $CW_{min,p}$ based on the explicit/implicit reception response for the previous UL burst. Alternatively, $CW_p$ may be increased to the next highest allowed value or maintained as it is.

(2) Type 2 UL CAP Method

In the Type 2 UL CAP, the length of a time duration spanned by sensing slots sensed to be idle before transmission(s) may be determined. The Type 2 UL CAP is classified into Type 2A/2B/2C UL CAPs. In the Type 2A UL CAP, the UE may perform transmission immediately after the channel is sensed to be idle at least for a sensing duration $T_{short\_dl}$=25 us. Here, $T_{short\_dl}$ includes the duration $T_f$(=16us) and one sensing slot duration immediately after the duration $T_f$. In the Type 2A UL CAP, $T_f$ includes a sensing slot at the beginning thereof. In the Type 2B UL CAP, the UE may perform transmission immediately after the channel is sensed to be idle for the sensing duration $T_f$=16us. In the Type 2B UL CAP, $T_f$ includes a sensing slot within 9 us from the end of the duration. In the Type 2C UL CAP, the UE does not perform channel sensing before performing transmission.

RB Interlace

Figure 9:
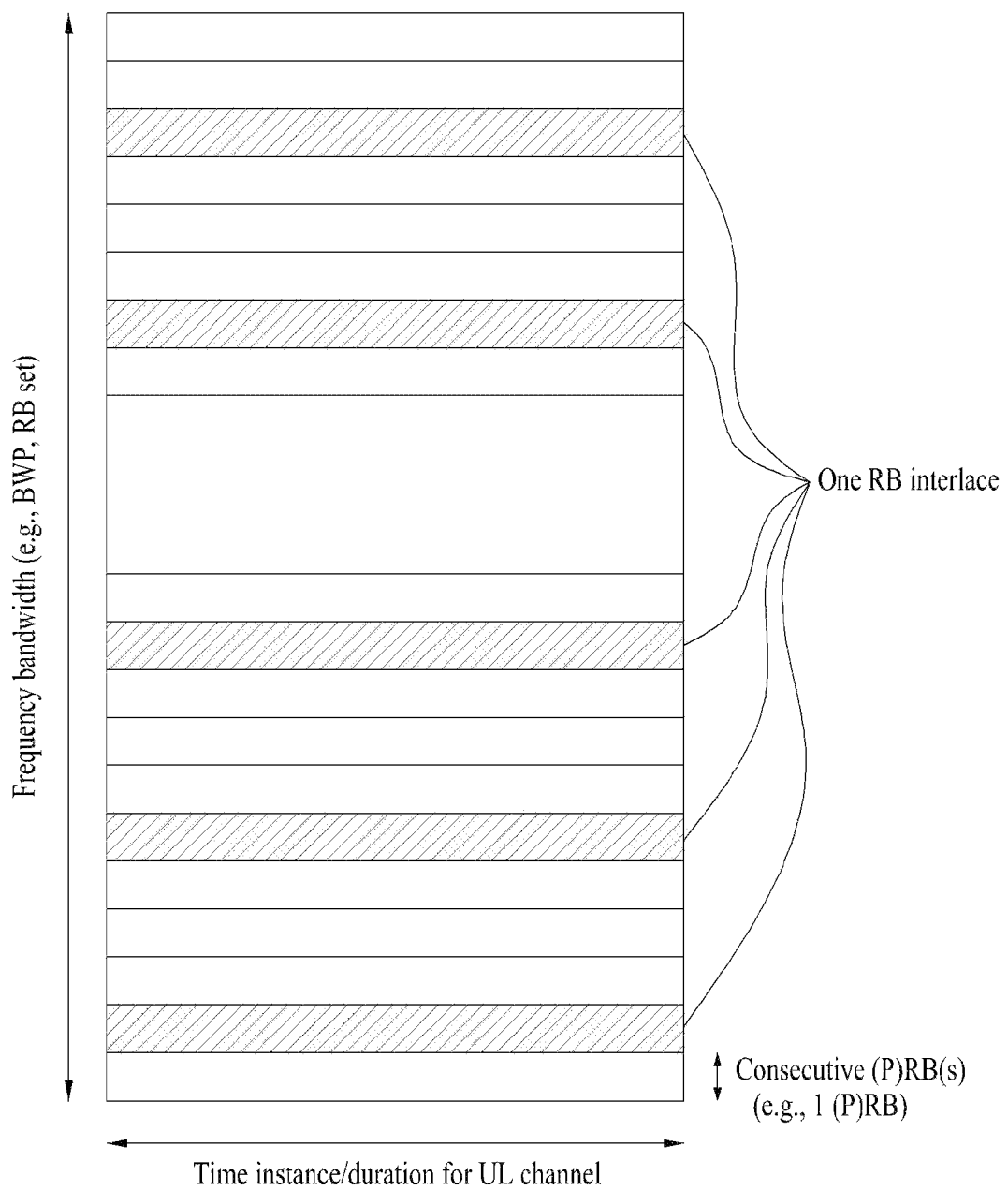
FIG. 9 illustrates a resource block (RB) interlace.

FIG. 9 illustrates an RB interlace. In a shared spectrum, a set of inconsecutive RBs (at the regular interval) (or a single RB) in the frequency domain may be defined as a resource unit used/allocated to transmit a UL (physical) channel/signal in consideration of regulations on occupied channel bandwidth (OCB) and power spectral density (PSD). Such a set of inconsecutive RBs is defined as the RB interlace (or interlace) for convenience.

Referring to FIG. 9, a plurality of RB interlaces (interlaces) may be defined in a frequency bandwidth. Here, the frequency bandwidth may include a (wideband) cell/CC/BWP/RB set, and the RB may include a PRB. For example, interlace #m∈{0, 1, . . . , M−1} may consist of (common) RBs {m, M+m, 2M+m, 3M+m, . . . }, where M represents the number of interlaces. A transmitter (e.g., UE) may use one or more interlaces to transmit a signal/channel. The signal/channel may include a PUCCH or PUSCH.

2. Random Access Procedure

Figure 10A:
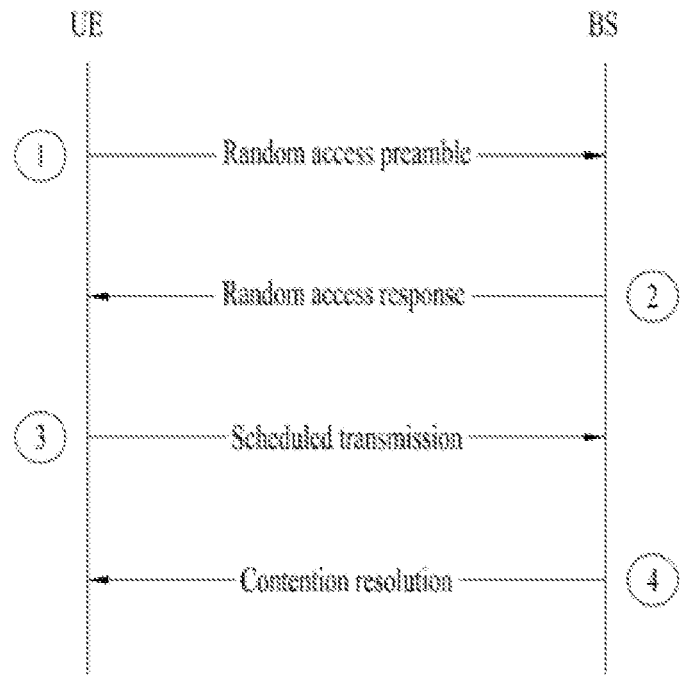
FIGS. 10A to 11B are a diagram illustrating a signal flow for a random access procedure.
Figure 10B:
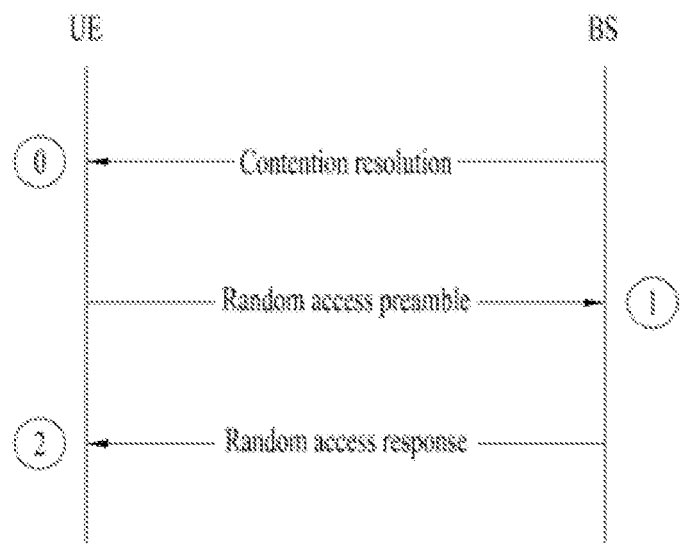

FIGS. 10A and 10B illustrate random access procedures. FIG. 10A illustrates the contention-based random access procedure, and FIG. 10B illustrates the dedicated random access procedure.

Referring to FIG. 10A, the contention-based random access procedure includes the following four steps. The messages transmitted in steps 1 to 4 may be referred to as message 1 (Msg1) to message 4 (Msg4), respectively.

Step 1: The UE transmits an RACH preamble on a PRACH.

Step 2: The UE receives a random access response (RAR) on a DL-SCH from the BS.

Step 3: The UE transmits a Layer 2 (L2)/Layer 3 (L3) message on a UL-SCH to the BS.

Step 4: The UE receives a contention resolution message on the DL-SCH from the BS.

The UE may receive random access information in system information from the BS.

When the UE needs random access, the UE transmits an RACH preamble to the BS as in step 1. The BS may identify each RACH preamble by a time/frequency resource (RACH occasion (RO)) in which the RACH preamble is transmitted, and a preamble index (PI).

Upon receipt of the RACH preamble from the UE, the BS transmits an RAR message to the UE as in step 2. To receive the RAR message, the UE monitors an L1/L2 PDCCH with a cyclic redundancy check (CRC) masked with a random access-RNTI (RA-RNTI), including scheduling information for the RAR message, within a preconfigured time window (e.g., ra-ResponseWindow). The PDCCH masked with the RA-RNTI may be transmitted only in a common search space. When receiving a scheduling signal masked with the RA-RNTI, the UE may receive an RAR message on a PDSCH indicated by the scheduling information. The UE then checks whether there is RAR information directed to the UE in the RAR message. The presence or absence of the RAR information directed to the UE may be determined by checking whether there is a random access preamble ID (RAPID) for the preamble transmitted by the UE. The index of the preamble transmitted by the UE may be identical to the RAPID. The RAR information includes the index of the corresponding RACH preamble, timing offset information (e.g., timing advance command (TAC)) for UL synchronization, UL scheduling information (e.g., UL grant) for Msg3 transmission, and UE temporary identification information (e.g., temporary-C-RNTI (TC-RNTI)).

Upon receipt of the RAR information, the UE transmits UL-SCH data (Msg3) on a PUSCH according to the UL scheduling information and the timing offset value, as in step 3. Msg3 may include the ID (or global ID) of the UE. Alternatively, Msg3 may include RRC connection request-related information (e.g., RRCSetupRequest message) for initial access. In addition, Msg3 may include a buffer status report (BSR) on the amount of data available for transmission at the UE.

After receiving the UL-SCH data, the BS transmits a contention resolution message (Msg4) to the UE as in step 4. When the UE receives the contention resolution message and succeeds in contention resolution, the TC-RNTI is changed to a C-RNTI. Msg4 may include the ID of the UE and/or RRC connection-related information (e.g., an RRC-Setup message). When information transmitted in Msg3 does not match information received in Msg4, or when the UE has not received Msg4 for a predetermined time, the UE may retransmit Msg3, determining that the contention resolution has failed.

Referring to FIG. 10B, the dedicated random access procedure includes the following three steps. Messages transmitted in steps 0 to 2 may be referred to as Msg0 to Msg2, respectively. The BS may trigger the dedicated random access procedure by a PDCCH serving the purpose of commanding RACH preamble transmission (hereinafter, referred to as a PDCCH order).

Step 0: The BS allocates an RACH preamble to the UE by dedicated signaling.
Step 1: The UE transmits the RACH preamble on a PRACH.
Step 2: The UE receives an RAR on a DL-SCH from the BS.

Steps 1 and 2 of the dedicated random access procedure may be the same as steps 1 and 2 of the contention-based random access procedure.

In NR, DCI format 1_0 is used to initiate a non-contention-based random access procedure by a PDCCH order. DCI format 1_0 is used to schedule a PDSCH in one DL cell. When the CRC of DCI format 1_0 is scrambled with a C-RNTI, and all bits of a "Frequency domain resource assignment" field are 1s, DCI format 1_0 is used as a PDCCH order indicating a random access procedure. In this case, the fields of DCI format 1_0 are configured as follows.

RA preamble index: 6 bits
UL/supplementary UL (SUL) indicator: 1 bit. When the bits of the RA preamble index are all non-zeroes and SUL is configured for the UE in the cell, the UL/SUL indicator indicates a UL carrier in which a PRACH is transmitted in the cell. Otherwise, it is reserved.
SSB (Synchronization Signal/Physical Broadcast Channel) index: 6 bits. When the bits of the RA preamble index are all non-zeroes, the SSB indicator indicates an SSB used to determine an RACH occasion for PRACH transmission. Otherwise, it is reserved.
PRACH mask index: 4 bits. When the bits of the RA preamble index are all non-zeroes, the PRACH mask index indicates an RACH occasion associated with the SSB indicated by the SSB index. Otherwise, it is reserved.
Reserved: 10 bits When DCI format 1_0 does not correspond to a PDCCH order, DCI format 1_0 includes fields used to schedule a PDSCH (e.g., a time domain resource assignment, a modulation and coding scheme (MCS), an HARQ process number, a PDSCH-to-HARQ_feedback timing indicator, and so on).

2-Step Random Access Procedure

In the prior art, random access is performed by a 4-step procedure as described above. In the legacy LTE system, an average of 15.5 ms is required for the 4-step random access procedure.

TABLE 10

| Component | Description | Time (ms) |
| --- | --- | --- |
| 1 | Average delay due to RACH scheduling period (1 ms RACH cycle) | 0.5 |
| 2 | RACH Preamble | 1 |
| 3-4 | Preamble detection and transmission of RA response (Time between the end RACH transmission and UE's reception of scheduling grant and timing adjustment) | 3 |
| 5 | UE Processing Delay (decoding of scheduling grant, timing alignment and C-RNTI assignment + L1 encoding of RRC Connection Request) | 5 |
| 6 | Transmission of RRC and NAS Request | 1 |
| 7 | Processing delay in eNB (L2 and RRC) | 4 |
| 8 | Transmisson of RRC Connection Set-up (and UL grant) | 1 |

The NR system may require lower latency than conventional systems. When random access occurs in a U-band, the random access may be terminated, that is, contention may be resolved only if the UE and BS sequentially succeed in LBT in all steps of the 4-step random access procedure. If the LBT fails even in one step of the 4-step random access procedure, resource efficiency may decrease, and latency may increase. If the LBT fails in a scheduling/transmission process associated with Msg2 or Msg3, the resource efficiency may significantly decrease, and the latency may significantly increase. For random access in an L-band, low latency may be required in various scenarios of the NR system. Therefore, a 2-step random access procedure may be performed in the L-band as well.

Figure 11A:
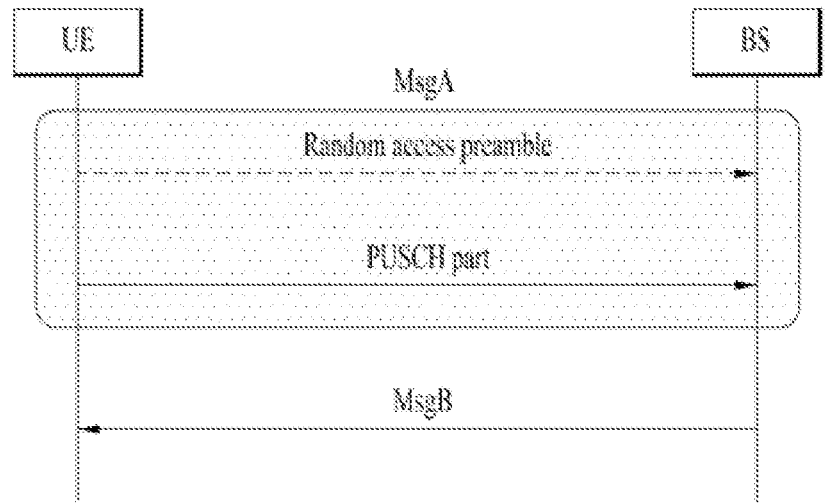

As illustrated in FIG. 11A, the 2-step random access procedure may include two steps: transmission of a UL signal (referred to as MsgA) from the UE to the BS and transmission of a DL signal (referred to as MsgB) from the BS to the UE.

Figure 11B:
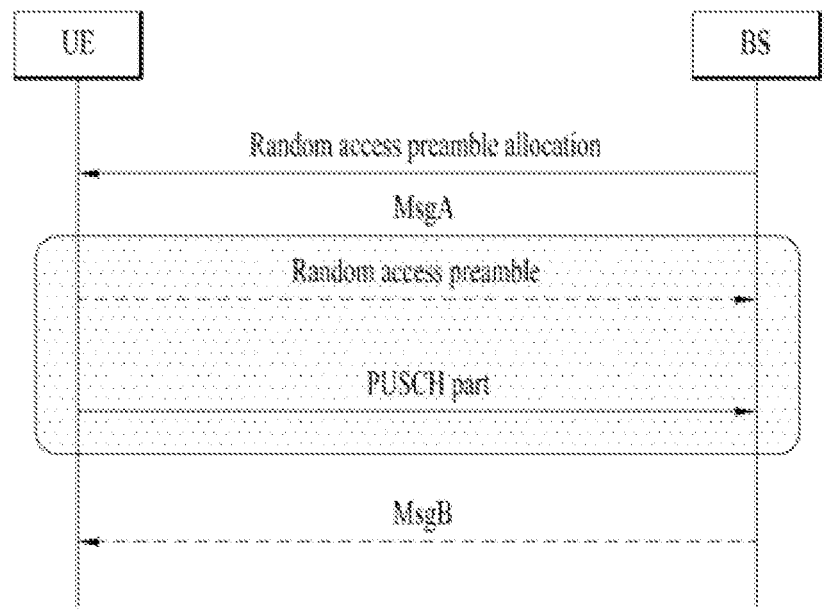

The following description focuses on the initial access procedure, but the proposed methods may be equally applied to the random access procedure after the UE and BS establish an RRC connection. Further, a random access preamble and a PUSCH part may be transmitted together in a non-contention random access procedure as shown in FIG. 11B.

While not shown, the BS may transmit a PDCCH for scheduling MsgB to the UE, which may be referred to as an MsgB PDCCH.

3. Random Access Procedure in U-Band

The above descriptions (NR frame structure, RACH, U-band system, etc.) are applicable in combination with methods proposed in the present disclosure, which will be described later. Alternatively, the descriptions may clarify the technical features of the methods proposed in the present disclosure.

As described above, the Wi-Fi standard (802.11ac) specifies a CCA threshold of −62 dBm for non-Wi-Fi signals and a CCA threshold of −82 dBm for Wi-Fi signals. In other words, a station (STA) or access point (AP) of the Wi-Fi system may transmit no signal in a specific band if the STA or AP receives a signal from a device not included in the Wi-Fi system in the specific band at a power of −62 dBm or higher.

Figures 12, 13:
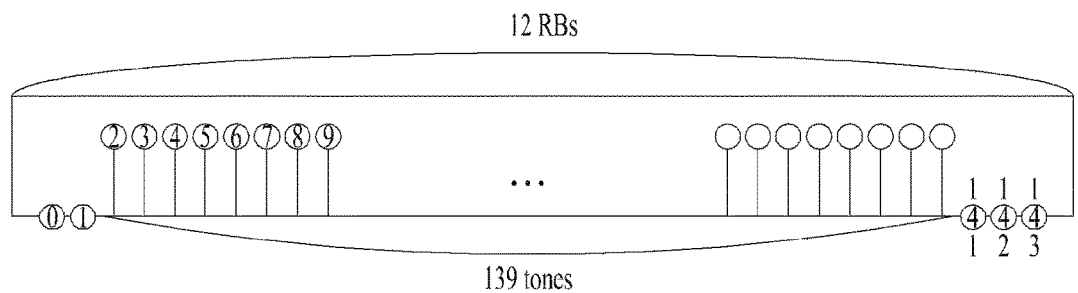
FIGS. 12 to 17 are diagrams illustrating uplink (UL) channel transmission according to the embodiments of the present disclosure.

The physical random access channel (PRACH) format may include a long RACH format and a short RACH format. A PRACH corresponding to the long RACH format is composed of a length 839 sequence. A PRACH corresponding to the short RACH format is composed of a 139-length sequence. Hereinafter, a structure of a sequence configured by the short RACH format is proposed. In the frequency range 1 (FR1) band of less than 6 GHz, the SCS of the short RACH format corresponds to 15 and/or 30 kHz. The PRACH corresponding to the short RACH format may be transmitted over 12 RBs as shown in FIGS. 10A and 10B. 12 RBs include 144 REs, and the PRACH may be transmitted on 139 tones (139 REs) among 144 REs. FIG. 12 shows that two REs having the lowest indexes and three REs having the highest indexes among the 144 REs correspond to null tones. However, the positions of the null tones may be different from those shown in FIG. 12.

In the present disclosure, the short RACH format may be referred to as a short PRACH format, and the long RACH format may be referred to as a long PRACH format. The PRACH format may be referred to as a preamble format.

The short PRACH format may be composed of values defined in Table 11.

TABLE 11

| Format | $L_{RA}$ | $\Delta f^{RA}$ | $N_u$ | $N_{CP}^{RA}$ |
|---|---|---|---|---|
| A1 | 139 | $15 \times 2^\mu$ kHz | $2 \times 2048 \kappa \times 2^{-\mu}$ | $288 \kappa \times 2^{-\mu}$ |
| A2 | 139 | $15 \times 2^\mu$ kHz | $4 \times 2048 \kappa \times 2^{-\mu}$ | $576 \kappa \times 2^{-\mu}$ |
| A3 | 139 | $15 \times 2^\mu$ kHz | $6 \times 2048 \kappa \times 2^{-\mu}$ | $864 \kappa \times 2^{-\mu}$ |
| B1 | 139 | $15 \times 2^\mu$ kHz | $2 \times 2048 \kappa \times 2^{-\mu}$ | $216 \kappa \times 2^{-\mu}$ |
| B2 | 139 | $15 \times 2^\mu$ kHz | $4 \times 2048 \kappa \times 2^{-\mu}$ | $360 \kappa \times 2^{-\mu}$ |
| B3 | 139 | $15 \times 2^\mu$ kHz | $6 \times 2048 \kappa \times 2^{-\mu}$ | $504 \kappa \times 2^{-\mu}$ |
| B4 | 139 | $15 \times 2^\mu$ kHz | $12 \times 2048 \kappa \times 2^{-\mu}$ | $936 \kappa \times 2^{-\mu}$ |
| C0 | 139 | $15 \times 2^\mu$ kHz | $2048 \kappa \times 2^{-\mu}$ | $1240 \kappa \times 2^{-\mu}$ |
| C1 | 139 | $15 \times 2^\mu$ kHz | $4 \times 2048 \kappa \times 2^{-\mu}$ | $2048 \kappa \times 2^{-\mu}$ |

In Table 11, $L_{RA}$ is the length of the RACH sequence, $\Delta f_{RA}$ is the SCS applied to the RACH, and $x=T_s/T_c=64$. For $\mu \in \{0,1,2,3\}$, $\mu$ is defined as one of 0, 1, 2, and 3 according to the SCS. For example, $\mu$ is defined as 0 for the 15 kHz SCS, and defined as 1 for the 30 kHz SCS.

A BS may announce, through higher layer signaling, which PRACH format can be transmitted at a specific timing for a specific duration, and how many ROs are in the corresponding slot. Table 6.3.3.2-2 to Table 6.3.3.2-4 of the standard 38.211 correspond to this case. Table 12 shows only a few specific excerpts from the indexes that may use A1, A2, A3, B1, B2, or B3 or a combination thereof in Table 6.3.3.2-3 of the standard 38.211.

TABLE 12

| PRACH Configuration Index | Preamble format | $n_{SFN}$ mod $x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 81 | A1 | 1 | 0 | 4,9 | 0 | 1 | 6 | 2 |
| 82 | A1 | 1 | 0 | 7,9 | 7 | 1 | 3 | 2 |
| 100 | A2 | 1 | 0 | 9 | 9 | 1 | 1 | 4 |
| 101 | A2 | 1 | 0 | 9 | 0 | 1 | 3 | 4 |
| 127 | A3 | 1 | 0 | 4,9 | 0 | 1 | 2 | 6 |
| 128 | A3 | 1 | 0 | 7,9 | 7 | 1 | 1 | 6 |
| 142 | B1 | 1 | 0 | 4,9 | 2 | 1 | 6 | 2 |
| 143 | B1 | 1 | 0 | 7,9 | 8 | 1 | 3 | 2 |
| 221 | A1/B1 | 1 | 0 | 4,9 | 2 | 1 | 6 | 2 |
| 222 | A1/B1 | 1 | 0 | 7,9 | 8 | 1 | 3 | 2 |
| 235 | A2/B2 | 1 | 0 | 4,9 | 0 | 1 | 3 | 4 |
| 236 | A2/B2 | 1 | 0 | 7,9 | 6 | 1 | 2 | 4 |
| 251 | A3/B3 | 1 | 0 | 4,9 | 0 | 1 | 2 | 6 |
| 252 | A3/B3 | 1 | 0 | 7,9 | 2 | 1 | 2 | 6 |

It may be seen from Table 12 how many ROs are defined in the RACH slot for each preamble format (see Number of time-domian PRACH occasions within a PRACH slot in Table 12), how many Orthogonal frequency-division multiplexing (OFDM) symbols are occupied by the PRACH preamble of each preamble format (see PRACH duration in Table 12). In addition, the starting symbol of the first RO may be indicated for each preamble format, and accordingly information on a point in time at which the RO starts in the RACH slot may be transmitted/received between the BS and the UE. FIG. 13 shows how ROs are configured in a RACH slot for each PRACH configuration index value of Table 12.

A device operating in the unlicensed band checks whether a channel on which a signal is to be transmitted is in an idle mode or a busy mode. When a channel is in the idle mode, the signal is transmitted on the channel. When the channel is in the busy mode, the device to transmit the signal waits until the channel tunes into the idle mode before transmitting the signal. As previously described with reference to FIGS. 6 and 7, such an operation may be referred to as an LBT or channel access scheme. In addition, there may be LBT categories as shown in Table 13.

and/or configured by the BS. K is the selected backoff counter value, and $m_p$ corresponds to a slot time applied according to the channel access priority class. The channel access priority class and LBT category for PRACH transmission may be configured as shown in Table 14.

TABLE 13

The channel access schemes for NR-based access for unlicensed spectrum can be classified into the following categories:
    Category 1: Immediate transmission after a short switching gap
        This is used for a transmitter to immediately transmit after a switching gap inside a COT.
        The switching gap from reception to transmission is to accommodate the transceiver turnaround time and is no longer than 16 µs.
    Category 2: LBT without random back-off
        The duration of time that the channel is sensed to be idle before the transmitting entity transmits is deterministitic.
    Category 3: LBT with random back-off with a contention window of fixed size
        The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.
    Category 4: LBT with random back-off with a contention window of variable size
        The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

LBT corresponding to Category 1 is a method of channel access without LBT. According to the LBT corresponding to Category 1, when the time gap from the time at which a specific node occupies the channel to a time immediately before the next transmission is shorter than 16 us, the specific node may access the channel regardless of the mode. Next, Category 2 LBT is a method of access to a channel after performing one-shot LBT without a back-off counter value. According to the LBT corresponding to Category 2, a specific node performs transmission after determining whether the channel is idle for 16 us (or 25 us).

For LBTs corresponding to Category 3 and Category 4, a backoff counter value is randomly selected within a contention window (CW). In the present disclosure, the LBT corresponding to Category 3 may be referred to as Cat 3 LBT, and the LBT corresponding to Category 4 may be referred to as Cat 4 LBT. For the LBT corresponding to Category 3, a backoff counter value is randomly selected based on a fixed contention window size value at all times. For the LBT corresponding to Category 4, the contention window size starts from the initial minimum contention window size value and is incremented by 1 step in the allowed candidates each time the LBT fails. The maximum and minimum values of the contention window size and the allowed candidate contention window size values are predefined for each channel access priority class (see Tables 3 and 4). For example, in the case of Cat 4 LBT whose channel access priority class is 4, the UE initially selects a backoff counter value randomly from among 0 to 15. When the UE fails in LBT, it randomly selects a backoff counter value from among 0 to 31.

When the channel is idle for 16+9×mp+K×9 us, the UE selecting the backoff counter value based on the values defined in Table 9 performs uplink transmission indicated

TABLE 14

|  | Cat 2 LBT | Cat 4 LBT |
|---|---|---|
| PUSCH (including at least UL-SCH with user plane data) | N/A except for the cases discussed in Note 2 below | Channel access priority class is selected according to the data |
| SRS-only | N/A | Cat4 with lowest channel access priority class value (as in LTE eLAA) |
| RACH-only | (see Note 2) | Cat4 with lowest channel access priority class value |
| PUCCH-only | (see Note 2) | Cat4 with lowest channel access priority class value |

Note 2:
Applicability of a channel access scheme other than Cat 4 for the following signals/channels have been discussed and details are to be determined when the specifications are developed:
UL control information including UCI only on PUSCH, e.g. HARQ-ACK, Scheduling Request, and Channel State Information
Random Access Based on the values derivable from Tables 13 and 14, the UE may start PRACH transmission when the channel is idle for 16+9*2+K*9(=34+K*9) us. As described above, the backoff counter value K is randomly selected within the size-varying contention window size.

The 2-step random access procedure described above includes transmission of message A (including Msg. A, PRACH preamble and Msg3 PUSCH) from the UE and transmission of message B (including Msg. B, RAR and Msg. 4 PDSCH) from the BS. For simplicity, in the present disclosure, a time and frequency resource at which the PRACH preamble signal of Msg. A is mapped/transmitted is defined as a RACH occasion (RO), and a time and frequency resource at which the Msg. 3 PUSCH signal is mapped/transmitted is defined as a PUSCH occasion (PO). In the following description, a specific method of configuring Msg. A is proposed. The RACH preamble constituting Msg. A may be referred to as a Msg. A RACH preamble and Msg. A PRACH. The Msg. 3 PUSCH constituting Msg. A may be referred to as a Msg. A PUSCH. The RAR constituting Msg. B may be referred to as a Msg. B RAR. The Msg. 4 PDSCH constituting Msg. B may be referred to as a Msg. B PDSCH.

Hereinafter, an operation of a UE for performing UL transmission using a UL interlace, proposed in the present disclosure, will be described.

(1) First, the UE receives UL interlace configuration information for UL transmission from the BS. The UL interlace configuration information may include information about a UL interlace index for a UL interlace that satisfies the defined OCB requirements for each SCS. (2) The UE determines at least one UL interlace based on the UL interlace configuration information. (3) The UE performs UL transmission to the BS on the determined at least one UL interlace.

For more details, reference will be made to methods described below. That is, the methods described below may be combined with the procedure of operations (1) to (3) described above to achieve the objects/effects proposed in the present disclosure. In addition, the methods described below may be combined with the procedure described in 2. Random Access Procedure to achieve the objects/effects proposed in the present disclosure. In the present disclosure, the term "unlicensed band" may be replaced and interchangeably used with the terms "shared spectrum."

3.1 Embodiment 1: Frequency Domain Gap for Msg. A PUSCH Transmission

As described above, the UE transmits Msg. A PUSCH through a predetermined PO after transmitting the RACH preamble included in Msg. A. It is assumed that the BS has configured multiple POs operatively connected to one RO (or multiple ROs) as consecutive interlace indexes present in the same slot. When there are multiple UEs which are to transmit Msg. A PUSCH in a PO, timing advance (TA) values configured for the multiple UEs may be different from each other. There is no frequency gap between consecutive interlace indexes, as defined in the conventional system. Accordingly, when the TA values of the Msg. A PUSCHs transmitted by multiple UEs are different from each other, the Msg. A PUSCH reception performance of the BS may be degraded. In Embodiment 1, methods to prevent degradation of reception performance for Msg. A PUSCH are proposed.

Proposed Method 1-1: Providing a PRB level frequency gap between consecutive interlace indexes Opt 1-1-1) Allocating a specific interlace index for Msg. A PUSCH transmission, and excluding other specific interlace indexes from Msg. A PUSCH transmission As an example, when a 30 kHz SCS is used, a total of 5 interlace indexes may be present in a 20 MHz bandwidth. When the interlace indexes are #0, #1 , #2 , #3, and #4, the BS may define indexes #0, #2, and #4 as a PO for Msg. A PUSCH transmission, and exclude indexes #1 and #3 from Msg. A PUSCH transmission.

Opt 1-1-2) Indicating a starting PRB offset together with a specific interlace index (wherein the starting PRB offset may be set smaller than the interlace PRB gap).

As an example, when 30 kHz SCS is used, a total of 5 interlace indexes may be present in a 20 MHz bandwidth. When the interlace indexes are #0, #1 , #2 , #3, and #4, the BS sets the interlace index #0 to a PO for Msg. A PUSCH transmission and sets the starting PRB offset to 0. In addition, the BS may set the interlace index #1 to PO for Msg. A PUSCH transmission, and set the starting PRB offset to 1 RB. In addition, the BS may set the interlace index #2 to a PO for Msg. A PUSCH transmission, and set the starting PRB offset to 2 RBs.

When the starting PRB offset is set as described above, a result of calculating the starting PRB offset in combination with the interlace index may cause Msg. A PUSCH to be transmitted in a frequency band outside the LBT subband. The UE does not transmit Msg. A PUSCH in a PRB in a frequency band outside the LBT subband. For example, Msg. A PUSCH may be dropped in the PRB in a frequency band outside the LBT subband. The BS may also expect that the UE does not transmit Msg. A PUSCH in the PRB in the frequency band outside the LBT subband.

As a specific example, when an offset of Y PRBs is indicated to the interlace index #X composed of 11 RBs, and the (highest index) last 1 PRB is out of the LBT subband, the UE may configure the interlace only with 10 RBs excluding the last 1 PRB to transmit the PUSCH.

Opt 1-1-3) Msg. A PUSCH resource sets composed of specific interlace indexes may be defined and the BS may indicate one of the defined sets.

As an example, when 30 kHz SCS is used, a total of 5 interlace indexes may be present in a 20 MHz bandwidth. When the interlace indexes are #0, #1 , #2 , #3, and #4, Msg. A PUSCH resource sets may be defined as shown in Table 15.

TABLE 15

| Index | Interlace index candidates for Msg. A PUSCH resource set |
|---|---|
| 0 | All interlace index (e.g., #0, #1, #2, #3, #4) |
| 1 | Even numbered interlace index (e.g., #0, #2, #4) |
| 2 | Odd numbered interlace index (e.g., #1, #3) |
| 3 | Reserved |

The BS may select and indicate one of the indexes defined in Table 15 for Msg. A PUSCH transmission. For example, when the BS indicates index 1, even numbered interlace indexes may be set to PO, and thus a 1 PRB gap may be generated between interlace resources.

According to Opt 1-1-3, an RB level (e.g., 1RB) gap is guaranteed between interlaces on which Msg. A PUSCH is actually transmitted, and therefore degradation of reception performance caused by different TAs may not occur at the BS side. However, when available interlace indexes are fewer than a specific level (e.g., 5 interlaces in 30 kHz SCS), providing an RB level gap may result in lack of interlace indexes available as a PO, thereby increasing resource overhead.

Additionally, according to Opt 1-1-3, DMRS may also be transmitted according to the frequency resource of the PO on which the Msg. A PUSCH is transmitted.

Proposed Method 1-2: An RE level frequency gap may be provided between consecutive interlace indexes.

Opt 1-2-1) Among the REs in the PRB constituting an interlace corresponding to a specific index, N (N<12) REs may be excluded from the PO for Msg. A PUSCH transmission.

As an example, for a PRB constituting the interlace corresponding to a specific index, Msg. A PUSCH may be transmitted in the REs excluding one (lowest or highest) RE (i.e., by rate matching or dropping or puncturing the same). However, since each PRB is composed of 11 REs, it may not be suitable for the DFT size. The DFT size may be set to a multiple of 2, 3, or 5.

As another example, in the PRB constituting the interlace corresponding to a specific index, Msg. A PUSCH may be transmitted in the REs excluding two (lowest and highest, or 2 lowest, or 2 highest) REs (i.e., by rate matching or dropping or puncturing the same). Since each PRB is composed of 10 REs, the DFT size is configured appropriately.

As another example, the BS may configure information related to the RE level gap (e.g., the number and/or positions of REs in 1 PRB necessary (or unnecessary) for Msg. A PUSCH transmission). The RE level gap may be configured differently according to the SCS value for Msg. A.

According to Opt 1-2-1, in an RE at the same position as the RE in which the Msg. A PUSCH is configured not to be transmitted, the DMRS may be configured not to be transmitted (e.g., the DMRS may be punctured or dropped).

Alternatively, Msg. in an RE at the same position as the RE in which Msg. A PUSCH is configured not to be transmitted, a DMRS resource available for transmission may be configured to be excluded from the PO.

Figure 14:
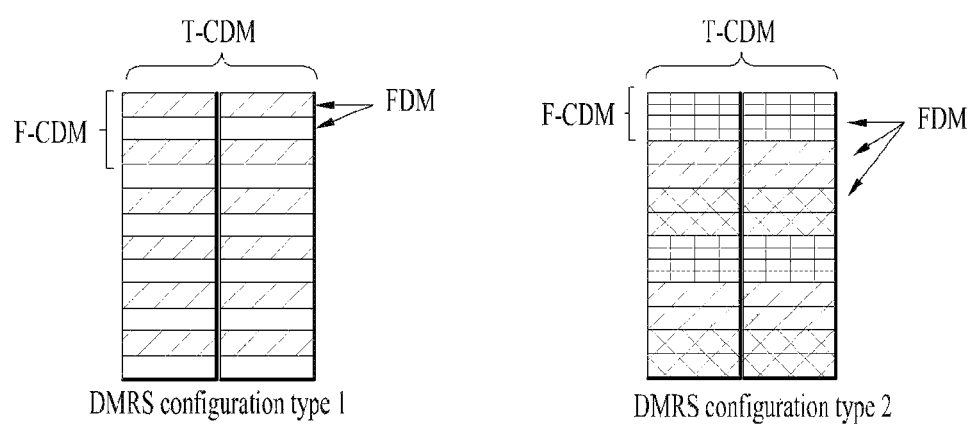

For example, Msg. A PUSCH may be configured to be transmitted without using the highest 1 RE (e.g., by puncturing or dropping the same). In the case of DMRS configuration type 1 in FIG. 14, DMRS resources indicated by hatched portions (corresponding to the highest 1 RE) may be excluded from the PO (i.e., when the RE positioned at the top is RE #11, DMRS resources composed of REs #11, #9, #7, #5, #3, and #1 may be excluded). In addition, in the case of DMRS configuration type 2 in FIG. 14, DMRS resources indicated by a cross pattern (corresponding to the highest 1 RE) may be excluded from the PO (i.e., when the RE positioned at the top is RE #11, DMRS resources composed of REs corresponding to #11, #10, #5, and #4 may be excluded).

Opt 1-2-2) A starting RE offset may be indicated together with a specific interlace index (wherein the RE offset may be set to be smaller than 1 PRB (or a PRB gap in the interlace)).

As an example, when 30 kHz SCS is used, a total of 5 interlace indexes may be present in a 20 MHz bandwidth. When the interlace indexes are #0, #1, #2, #3, and #4, the BS sets the interlace index #0 to a PO for Msg. A PUSCH transmission and sets the starting RE offset to 0. In addition, the BS may set the interlace index #1 to a PO for Msg. A PUSCH transmission, and set the starting RE offset to 1 RE. In addition, the BS may set the interlace index #2 to a PO for Msg. A PUSCH transmission, and indicate the starting RE offset as 2 REs. The starting RE offset may take the form of {interlace index X RE offset}.

When the starting RE offset is set as described above, a result of calculating the starting RE offset in combination with the interlace index may cause Msg. A PUSCH to be transmitted in a frequency band outside the LBT subband. The UE does not transmit Msg. A PUSCH in a PRB in a frequency band outside the LBT subband. For example, Msg. A PUSCH may be dropped in the PRB in a frequency band outside the LBT subband. The BS may also expect that the UE does not transmit Msg. A PUSCH in the PRB in the frequency band outside the LBT subband.

As a specific example, when an offset of Y REs is indicated to the interlace index #X composed of 11 RBs, and some REs in the (highest index) last 1 PRB are out of the LBT subband, the UE may configure the interlace only with 10 RBs excluding the last 1 PRB to transmit the PUSCH.

Additionally, according to Opt 1-2-2, Msg. DMRS may also be transmitted according to the frequency resource of the PO on which the Msg. A PUSCH is transmitted.

According to Opt 1-2-2, an RE level (e.g., 1RE) gap is guaranteed between interlaces on which Msg. A PUSCH is actually transmitted, and therefore degradation of reception performance caused by different TAs may not occur at the BS side.

Proposed Method 1-3: A new interlace structure with frequency spacing may be introduced.

A new interlace structure is proposed such that a gap of k REs is always present between consecutive interlace indexes (e.g., k=1).

The new interlace structure in which the gap of k REs is present may be configured to be used only for Msg. A PUSCH transmission in the 2-step random access procedure.

The existing Msg. 3 PUSCH and other channels (e.g., unicast PUSCH, PUCCH, etc.) are configured to use the interlace structure (with no RE gap) defined in the conventional system.

For example, the number of PRBs constituting the actual initial UL bandwidth part (BWP) is 48 (based on 30 kHz SCS). However, for the interlace structure in which the 1 RE gap is present, 44 PRBs may constitute 5 interlaces and 1 RE gaps are configured between consecutive interlace indexes.

In addition, to satisfy OCB requirements, a mid-gap corresponding to 5 REs may be added. 48 PRB*12 RE=576 RE, and 44 PRB*13 RE=572 RE. Therefore, 5 REs (the remaining 4 REs and 1 RE present after the last PRB) may be placed before the 23rd PRB and used as the mid-gap.

Figure 15:
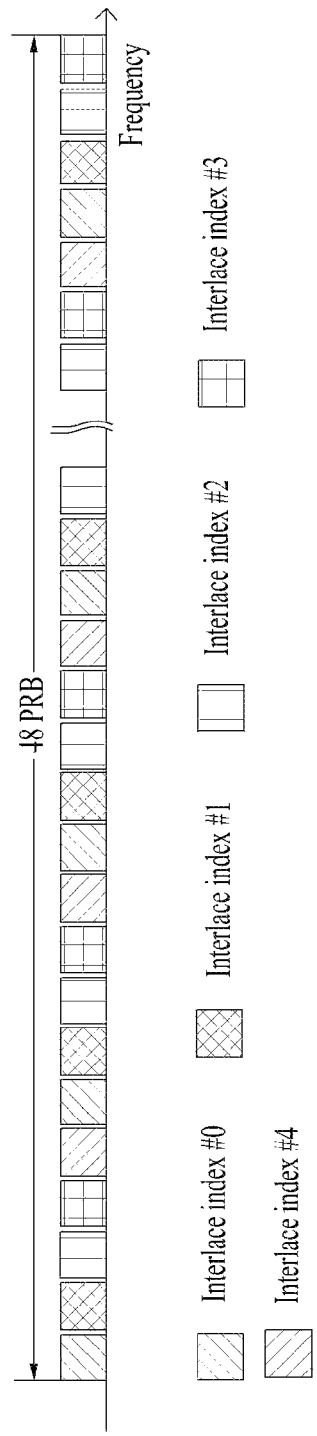

Alt 1-3-1) It is assumed that there are a total of 5 interlaces including 4 interlaces composed of 9 PRBs and one interlace composed of 8 PRBs (see FIG. 15).

The four interlaces composed of 9 PRBs satisfy the OCB requirements as follows: {30(kHz)*5(PRB interval in interlace)*13(12 RE+1 RE gap)*8 (PRB)}+{30 (kHz)*12 (RE)*1(PRB)}+{30 (kHz)*5 (mid-gap RE)}=16110 (kHz).

Four interlaces composed of 8 PRBs fail to satisfy the OCB requirements: {30 (kHz)*5(PRB gap in interlace)*13 (12 RE+1 RE gap)*7 (PRB)}+{30 (kHz)*12 (RE)*1 (PRB)}+{30 (kHz)*5 (mid-gap RE)}=14160 (kHz)

Figure 16:
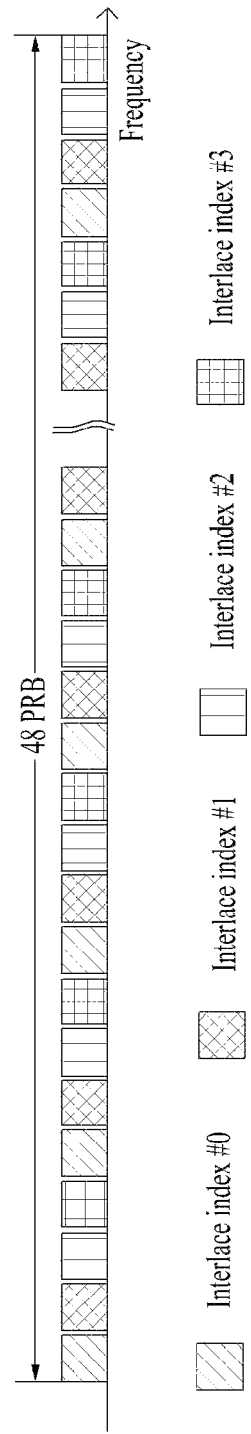

Alt 1-3-2) 4 interlaces composed of 11 PRBs may be present (see FIG. 16).

The 4 interlaces composed of 11 PRBs satisfy the OCB requirements as follows: {30(kHz)*4 (PRB gap in interlace)*13(12 RE+1 RE gap)*10 (PRB)}+{30 (kHz)*12 (RE)*1 (PRB)}+{30 (kHz)*5 (mid-gap RE)}=16110 (kHz).

When a new interlace structure with a gap of k REs is introduced by Proposed Method 1-3, an RE level (e.g., 1RE) gap is guaranteed between interlaces in which Msg. A PUSCH is actually transmitted. Therefore, reception performance degradation caused by different TAs may not occur at the BS side. In addition, since additional signaling from the BS is not required, signaling overhead may also be reduced.

According to Proposed Method 1-3, DMRS may also be transmitted according to the frequency resource of the PO through which the Msg. A PUSCH is transmitted.

Proposed Method 1-4: The UE may transmit Msg. A PUSCH by puncturing or rate matching a specific interlace index belonging to the PO resource indicated by the BS.

In the case where the BS configures interlace indexes for each of the POs, and the adjacent POs are consecutively configured without a frequency gap therebetween, when a guard band (having, for example, 1-RB size) is configured between adjacent POs, the actual Msg. A PUSCH may be transmitted in interlaces corresponding to the remaining interlace indexes except for a specific (e.g., one) interlace index within the configured PO. When no (non-zero) guard band is configured between adjacent POs, the actual Msg. A PUSCH may be transmitted in interlaces corresponding to all interlace indexes in the PO configured by the BS.

As an example, when the BS allocates N (e.g., N=2) (or more) interlace indexes for each PO, the actual Msg. A PUSCH may be transmitted using the interlaces except for the highest (or lowest) interlace index among the N interlaces. All PRBs constituting the highest (or lowest) interlace index may be punctured or rate matched in Msg. A PUSCH transmission.

As another example, when the BS allocates N (e.g., N=2) (or more) interlace indexes for each PO, the actual Msg. A PUSCH may be transmitted using the interlaces except for the interlace in which the first or last PRB is at the highest (or lowest) frequency. All PRBs constituting the interlace index in which the starting or last PRB is positioned at the highest (or lowest) frequency may be punctured or rate matched in Msg. A PUSCH transmission.

As another example, when the BS allocates N (e.g., N=2) (or more) interlace indexes for each PO, the actual Msg. A PUSCH may be transmitted using the interlaces except for the interlace configured as the last (e.g., highest) resource index (or the first (e.g., lowest) resource index) in the RRC configuration (for PO resource configuration). All PRBs constituting the interlace configured as the last (i.e., highest) (or first (i.e., lowest)) resource index in the RRC configuration may be punctured or rate matched in Msg. A PUSCH transmission.

Proposed Method 1-5: The UE may transmit Msg. A PUSCH with an interlace gap placed between multiple PO resources indicated by the BS.

In the case where the BS configures POs adjacent to each other, when a guard band (having, for example, 1-RB size) is configured between adjacent POs, a PO to be used for actual Msg. A PUSCH transmission may be reconfigured by inserting X (e.g. X=1) interlaces (or a set of non-consecutive or equally spaced PRBs corresponding thereto) between adjacent POs as a gap. When no (non-zero) guard band is configured, the actual Msg. A PUSCH may be transmitted using the interlace in the originally configured PO.

As an example, when the BS configures N POs adjacent to each other, a PO to be used for the actual Msg. A PUSCH transmission may be configured with an interlace gap (corresponding to, for example, one interlace) placed between adjacent POs. Specifically, the interlace index set to the PO at the lowest frequency position by the BS may be allocated to the PO, and the PO at the second lowest position is assigned an interlace index one interlace gap away from the lowest PO. In other words, an interlace index obtained by applying an offset corresponding to one interlace gap to the interlace index set for the PO by the BS is allocated. For example, for the PO at the second lowest position, "+1" may be applied to the interlace index allocated by the BS. For the K-th PO, an offset corresponding to K−1 interlace indexes may be applied to the interlace index set for the PO by the BS. For example, for the K-th PO, "+K−1" may be applied to the interlace index set to the PO by the BS.

Assuming that there is one interlace gap between N POs, a frequency band corresponding to a total of N+N−1 interlaces is required to actually configure the N POs.

In the case where a specific PO is allocated to an unavailable frequency band or invades other UL resources, the PO may be set to be invalid.

3.2 Embodiment 2: RO and PO in Same (or Consecutive) Slot Case

When an RO and a PO for the 2-step RACH are consecutively scheduled, the UE may share channel occupancy (CO) by performing the LBT procedure only once. Accordingly, in Embodiment 2, methods for consecutively scheduling the RO and the PO may be proposed.

Proposed Method 2-1: The BS may configure the last X OFDM symbol in slot N (i.e., OFDM symbols #14-X, . . . , #12, and #13 in slot N) as an RO, and configure the first Y OFDM symbols in slot N+1 (i.e., OFDM symbols #0, #1, . . . , and #Y−1 in slot N+1) as a PO (Assume that the RO and PO are linked to each other).

After transmitting the Msg. A preamble on the configured RO, the UE may operate in Cat-1 LBT (no LBT) by sharing the CO because the gap between the RO and the PO is 0, and then transmit the Msg. A PUSCH on the PO.

Proposed Method 2-1-1: In addition to Proposed Method 2-1, the BS may configure the remaining OFDM symbols of slot N as an RO for 4-step RACH. In this case, an LBT gap may be required between ROs.

Specifically, when n ROs are configured in slot N, only the last RO may be used as an RO for 2-step RACH, and the remaining ROs may be used as ROs for 4-step RACH. Because the last RO is in contact with the PO in the next slot N+1, it may be used for 2-step RACH. On the other hand, the remaining ROs may be used as ROs for 4-step RACH because they are not in contact with the PO.

Proposed Method 2-2: When an RO and a PO (of the same Msg. A) are configured in the RACH slot without a gap therebetween, the last RO in slot N and the first PO in slot N+1 may be connected without a gap The last RO may be shifted to the boundary of the slot N, or the end position thereof may be extended to the boundary of slot N with the starting position of the last RO fixed.

The connection between the last RO and the first PO may be established only when the gap between the last RO and the first PO is less than or equal to a specific level. When the gap is greater than or equal to a specific value, Msg. A may be configured while the last RO and the first PO are not connected and the gap therebetween is maintained.

Proposed Method 2-3: The BS may configure multiple ROs and POs consecutively present in a specific slot (without an gap between the ROs and the POs)

After transmitting the Msg. A preamble on an RO, the UE may operate in Cat-1 LBT (no LBT) by sharing the CO because the gap between the RO and the PO is 0, and then transmit the Msg. A PUSCH on the PO.

Specifically, in order to configure a structure as in Proposed Method 2-3, ROs and POs may be consecutively configured, respectively, and then information indicating a valid (or invalid) occasion for each of the ROs and POs may be additionally transmitted.

For example, 6 ROs each composed of 2 OFDM symbols may be configured in slot N (assuming that a starting offset of 2 symbols is indicated and the ROs are positioned from the third OFDM symbol), and 6 POs each composed of 2 OFDM symbols may be configured in slot N (similarly assuming that a starting offset by 2 symbols is indicated and the POs are positioned from the third OFDM symbol). Thereafter, the BS may transmit information indicating that only even numbered ROs are valid and odd numbered ROs are invalid, and information indicating that only odd numbered POs are valid and even numbered POs are invalid. The information may be transmitted using a method such as a bit map or 1-bit even/odd selection. In slot N, three occasions of RO and PO may appear from the third OFDM symbol without an gap. Even in this case, an LBT gap may be needed between the three occasions of RO and PO.

Proposed Method 2-4: Immediately after the LBT is successful (or at a specific position that is present after the time when the LBT is successful), the UE may transmit an Msg. A preamble and then subsequently transmit Msg. A PUSCH immediately.

For example, the BS configures the RO and PO in units of a plurality of (half) slots. After performing the LBT procedure within the configured (half) slots, the UE may transmit a preamble on the RO by applying a format and repetition corresponding to a PRACH configuration index set immediately after the time when the LBT is successful or set according to the symbol boundary (or (half) slot boundary) that is present immediately after the time when the LBT is successful. Subsequently, it may transmit the Msg. A PUSCH on the PO.

In another example, the BS may configure ROs in the time domain so as to overlap each other, and transmit the Msg. A preamble starting on the nearest RO from the LBT start time. Immediately thereafter, it may transmit Msg. A PUSCH.

For example, the BS may configure 6-symbol ROs including RO #1, which starts from symbol #0, RO #2, which starts from symbol #1, RO #3, which starts from symbol #2, and so on. When the UE succeeds in Cat-4 LBT immediately ahead of RO #3, it may transmit the Msg. A preamble on RO #3 and transmit Msg. A PUSCH immediately thereafter.

According to Proposed Method 2-4, transmission occasions for the Msg. A preamble and PUSCH may increase from the perspective of the UE, but the number of BDs may increase, which is a burden on the BS.

Specifically, when the band of the RO constituting the same Msg. A is set to be smaller than or different from the band of the PO, the RO and the PO may be configured (in different slots) with a time gap placed therebetween. Alternatively, when the band of the RO is smaller than or different from the band of the PO and there is no time gap between the RO and the PO, only a portion aligned with the band of the RO may be determined as the PO resource. When the band of the RO is set to be greater than or equal to the band of the PO, the RO and the PO may be configured either with a time gap or without a time gap therebetween.

3.3 Embodiment 3: Resource Allocation Type for Msg. 3 PUSCH (or Msg. A PUSCH)

When Msg. 3 PUSCH (or Msg. A PUSCH) is transmitted in the RACH procedure, the UE needs to know whether the method of PRB level resource allocation is used or the method of interlace level resource allocation is used.

As the most basic method, a default RA type for Msg. 3 PUSCH (or Msg. A PUSCH) may be determined. In addition, the BS may configure an RA type through higher layer signaling (e.g., SIB or RMSI, etc.), thereby indicating the RA type (other than the default RA type) directly to the UE. That is, when there is no RA type for Msg. 3 PUSCH (or Msg. A PUSCH) directly configured by the BS, the BS and the UE may transmit and receive Msg. 3 PUSCH (or Msg. A PUSCH) based on the default RA type.

Alternatively, the RA type for Msg. 3 PUSCH (or Msg. A PUSCH) may be directly indicated through Msg. 2 RAR (or Msg. B RAR). To this end, a default RA type for Msg. 3 PUSCH (or Msg. A PUSCH) may be determined. When there is no RA type directly configured through the Msg. 2 RAR (or Msg. B RAR), the BS and the UE may transmit and receive Msg. 3 PUSCH (or Msg. A PUSCH) based on the default RA type.

3.4 Embodiment 4: CP extension for Msg. A PRACH and Msg. A PUSCH

In the case where a RACH slot in which the Msg. A preamble is transmitted and a PUSCH slot in which the Msg. A PUSCH is transmitted are consecutively configured, an RO is positioned after the RACH slot, and a PO is positioned before the PUSCH slot, while the RO and the PO are associated with each other (by the same Msg. A configuration), the UE may extend the CP of Msg. A PUSCH and use the RO and the PO through only one LBT procedure without a gap therebetween. In other words, the UE may perform the operation of channel occupancy (CO) sharing by extending the CP of Msg. A PUSCH to eliminate the gap between the RO and the PO.

In this case, the size of a gap between the RO and the PO in which CP extension may be allowed and a situation and conditions in which CP extension of Msg. A PUSCH is allowed may be defined.

4-1) Size of the gap between the RO (or PRACH signal) and the PO (or PUSCH signal) in which CP extension is allowed CP extension may be an operation of extending the PRACH signal to the PUSCH starting symbol to fill the gap between the RO and the PO with the PRACH signal, or extending the CP of the PUSCH starting symbol to the last symbol of the PRACH to fill the gap between the RO and the PO with the CP.

Alt 4-1-1) A gap size set to be smaller than or equal to 1-symbol (or 1-symbol for 15 kHz SCS, 2-symbols for 30 kHz SCS, or 4-symbols for 60 kHz SCS), the maximum gap in which CP extension defined in NR-U is allowed.

Alt 4-1-2) A gap size set to be smaller than or equal to 2-symbols (for 15/30 kHz SCS) or 4-symbols (for 60 kHz SCS), which is the minimum gap defined between the RO (or PRACH signal) and the PO (or PUSCH signal) for NR 2-step RACH)

Alt 4-1-3) The BS may indicate, through SIB, the maximum size of the gap in which CP extension is allowed.

4-2) Conditions for allowing CP extension between the RO (or PRACH signal) and the PO (or PUSCH signal)

Alt 4-2-1) When the gap between the RO (PRACH) and the PO (PUSCH) associated therewith (by the same Msg. A configuration) satisfies the gap size of 4-1) above, CP extension may be allowed. Alternatively, the BS may indicate/set, through the SIB, whether the CP extension is allowed.

Alt 4-2-2) When the gap between the RO (PRACH) and the PO (PUSCH) associated therewith (by the same Msg. A configuration) satisfies the gap size of 4-1) above, while the PO is not associated with other ROs configured on a symbol different from that of the associated RO, that is, when one PO is associated with an RO that satisfies the gap size and is also associated with an RO that does not satisfy the gap size, the CP extension may not be allowed. As an example, UE1 that has selected an RO that does not satisfy the gap size may intend to transmit Msg. A PUSCH on a PO associated with the selected RO, and UE2 that has selected an RO that satisfies the gap size may also intend to transmit Msg. A PUSCH on the with the selected RO. In this case, the POs associated with the two ROs may be the same. UE1 may perform LBT once more before the PO, but UE2 may perform CP extension. Accordingly, UE1 may always fail in the LBT and fail to transmit the Msg. A PUSCH on the PO. Therefore, when one PO is associated with both an RO that satisfies the gap size and an RO that does not satisfy the gap size, CP extension may not be allowed. Alternatively, the BS may indicate/set, through the SIB, whether the CP extension is allowed.

Alt 4-2-3) the BS may indicate/set, through the SIB, which of Alt 4-2-1 and Alt 4-2-2 is to be applied as a condition for allowing the CP extension and/or whether the CP extension is allowed.

Additionally, depending on whether the UE supports the CP extension, the CP extension operation may not be performed. That is, even when the BS indicates/sets the CP extension operation through SIB1, the UE may fail to follow the contents related to the CP extension indicated by the BS unless the UE capability supports the CP extension operation. When the UE does not support the CP extension, 4-step RACH may be used instead of 2-step RACH.

3.5 Embodiment 5: Frequency Offsets for FDMed ROs in NR-U

When the PRACH uses a 30 kHz SCS, a length-571 Zadoff-Chu (ZC) sequence may be used as the PRACH preamble sequence. When the PRACH uses a 15 kHz SCS, a Length-1151 ZC sequence may be used as the PRACH preamble sequence. In addition, FDM of RO may be configured in NR-U. According to the conventional system, the number of FDMed ROs is indicated by the parameter msg1-FDM (=1, 2, 4, 8), and the starting frequency position of the RO positioned at the lowest frequency among the FDMed ROs is indicated by the parameter msg1-FrequencyStart (PRB level offset).

However, a UL active BWP may be indicated as including one or multiple RB sets. A UL active BWP including multiple RB sets may include an intra-cell guard PRB. When multiple ROs are configured by FDM, intra-cell guard PRBs in the UL active BWP may be positioned in the middle of the ROs, which is inappropriate to transmission of a PRACH sequence.

Therefore, multiple FDMed ROs may be configured to be present one in each UL RB set, and the following solutions are proposed.

[Proposed Method 5-1]: The starting frequency position of multiple FDMed ROs may be configured to start based on the lowest PRB of each UL RB set.

Opt 5-1-1) In addition to method 1 above, the starting frequency position of each RO may be commonly indicated using an existing parameter (i.e., msg1-FrequencyStart). For example, the starting frequency position of each RO may be set to a position obtained by adding a value of a single offset parameter to the lowest PRB in each UL RB set. The single offset parameter may be msg1-FrequencyStart. The single offset parameter may be applied to all UL RB sets in common.

Opt 5-1-2) In addition to method 1 above, an independent parameter may be added for each RO to independently indicate the starting frequency position of each RO. For example, the starting frequency position of each RO may be set to a position obtained by adding the value of an offset parameter set individually/independently (for each UL RB set) to the lowest PRB in each UL RB set. The offset parameter that is set individually/independently may be msg1-FrequencyStart. The frequency offset may be in units of PRBs or REs (subcarriers).

Opt 5-1-3) Parameter S (i.e., msg1-FrequencyStart) for the starting position of the RO positioned at the lowest frequency in the UL active BWP, and parameter N for the number of ROs FDMed in the frequency domain may be configured through higher layer signaling (e.g. SIB, RRC). The gap between the starting PRB index (corresponding to the value of parameter S) of the RO positioned at the lowest frequency and the lowest PRB index in the UL RB set including the RO positioned at the lowest frequency is defined as the RO offset (e.g. RO offset=R). The set index of the UL RB set including the RO positioned at the lowest frequency may be A. The remaining N−1 ROs are allocated to N−1 UL RB sets that are consecutive in frequency after the UL RB set A including the RO positioned at the lowest frequency, respectively. For the N−1 ROs allocated to the N−1 UL RB sets, the RO offset value, R is equally applied as the gap between the lowest PRB index in each UL RB set and the starting PRB index of the RO included in each UL RB set.

When a specific PRACH preamble sequence (having, for example, a short length) is configured and multiple ROs consecutive in terms of frequency within a UL RB set are allocable, the RO offset R is equally applied to the RO positioned at the lowest frequency in each UL RB set by Opt 5-1-3. Multiple ROs consecutive in the frequency domain are allocated from the RO positioned at the lowest frequency in each UL RB set. The maximum number of the multiple ROs may be set to the maximum number of ROs that may be completely included in the UL RB set while being consecutive from the RO positioned at the lowest frequency in each UL RB set. After ROs consecutive in the frequency domain are allocated in each UL RB set starting with the UL RB set A including the RO positioned at the lowest frequency, ROs may be allocated to each of UL RB sets consecutive in the frequency domain.

Opt 5-14) Parameter S (i.e., msg1-FrequencyStart) for the starting position of the RO positioned at the lowest frequency in the UL active BWP, and parameter N for the number of ROs FDMed in the frequency domain may be configured through higher layer signaling (e.g. SIB, RRC). The gap between the starting PRB index (corresponding to the value of parameter S) of the RO positioned at the lowest frequency and the lowest PRB index in the UL RB set including the RO positioned at the lowest frequency is defined as the RO offset. The set index of the UL RB set including the RO positioned at the lowest frequency may be A. The RO offset is applied only to the RO positioned at the lowest frequency. The remaining N−1 ROs are allocated to N−1 UL RB sets that are consecutive in frequency after the UL RB set A including the RO positioned at the lowest frequency, respectively. For the N−1 ROs allocated to the N−1 UL RB sets, the lowest PRB index in each UL RB set is set to the starting PRB index of the RO included in the UL RB set (i.e., RO offset=0).

When a specific PRACH preamble sequence (having, for example, a short length) is configured and multiple ROs consecutive in terms of frequency within a UL RB set are allocable, the RO offset R or 0 is applied to the RO positioned at the lowest frequency in each UL RB set by Opt 5-1-4. Multiple ROs consecutive in the frequency domain are allocated from the RO positioned at the lowest frequency in each UL RB set. The maximum number of the multiple ROs may be set to the maximum number of ROs that may be completely included in the UL RB set while being consecutive from the RO positioned at the lowest frequency in each UL RB set. After ROs consecutive in the frequency domain are allocated in each UL RB set starting with the UL RB set A including the RO positioned at the lowest frequency, ROs may be allocated to each of UL RB sets consecutive in the frequency domain.

The RB set assumed by the UE in Proposed Method 5-1 may be an RB set based on the nominal guard band defined in the RAN4 spec, not the RB set based on a guard band configured through RRC. Based on this RB set configuration, the PRACH mapping method in Proposed Method 5-1 may be carried out/applied.

[Proposed Method 5-2]: A parameter indicating a gap between multiple FDMed ROs may be added.

The starting frequency position of the RO positioned at the lowest frequency among the multiple ROs subjected to FDM may be indicated using an existing parameter (i.e., msg1-FrequencyStart). The starting frequency position of the next RO is a position separated by a specific frequency offset from the highest frequency position occupied by the immediately preceding RO using the added parameter. The frequency offset may be in units of PRBs or REs (subcarriers).

The RB set assumed by the UE in Proposed Method 5-2 may be an RB set based on the nominal guard band defined in the RAN4 spec, not an RB set based on a guard band configured through RRC. Based on this RB set configuration, the PRACH mapping method in Proposed Method 5-1 may be carried out/applied.

Proposed Methods 5-1 and 5-2 may be applied regardless of the presence or absence of the intra-cell guard PBR in the UL active BWP. Additionally, Proposed Methods 5-1 and 5-2 may be applied only when the intra-cell guard PRB is present in the UL active BWP. Proposed Methods 5-1 and 5-2 may be configured to be applied only when the intra-cell guard PRB is present in the active BWP. In this case, the configuration of the conventional system may be applied when the intra-cell guard PRB is not present in the UL active BWP.

3.6 Embodiment 6: Guard Band for PUSCH Transmission in RACH Procedure

When a PUSCH (i.e., Msg. 3 PUSCH (or Msg. A PUSCH)) is transmitted in the RACH procedure, the number and positions of PRBs in which the PUSCH is transmitted may differ between UEs depending on whether the UEs have acquired guard band configuration information.

As an example, an idle mode UE that has failed to acquire the guard band configuration information may recognize that PRBs based on the nominal guard band information are the guard band and determine an RB set range. A connected mode UE that has acquired the guard band configuration information may determine the RB set range by checking the guard band configuration information acquired from the BS. In this case, the RB sets ranges configured by the two UEs may be different from each other according to the guard band information configured by the BS. Accordingly, Msg. 3 PUSCH (or Msg. A PUSCH) may be transmitted on a UL resource (e.g., interlaced PRB) composed of a different number of PRBs for each UE. Therefore, the BS may need to address this issue of blind decoding (BD) in those two cases.

Therefore, the UE and the BS may be configured to determine that the RB set is configured according to the nominal guard band information when Msg. 3 PUSCH (or Msg. A PUSCH) is transmitted. Transmitting the Msg. 3 PUSCH (or Msg. A PUSCH) corresponds to a case where PUSCH indicated by the RAR grant, PUSCH scheduled by DCI 0_0 scrambled with TC-RNTI, or Msg. A PRACH is transmitted, and then Msg. A PUSCH is transmitted on the PO associated with the corresponding RO. The UE and the BS may operate to transmit and receive Msg. 3 PUSCH (or Msg. A PUSCH) using only the PRB resources in the corresponding RB set based on the RB set in which the nominal guard band is configured. When they are configured in this way, the BS may not need to perform BD when receiving the Msg. 3 PUSCH (or Msg. A PUSCH).

Specifically, the proposed method above may be applied in contention based random access (CBRA). In other words, since the RACH procedure is performed based on contention between multiple UEs, Msg. 3 PUSCH (or Msg. A PUSCH) is also transmitted from multiple UEs in an overlapping manner. Therefore, in order not to increase the BD complexity of the BS, the Msg. 3 PUSCH (or Msg. A PUSCH) may be configured to be transmitted on a UL resource (e.g., interlaced PRB) composed of the same number of PRBs.

In a situation in which the BS has issued an order of operation in contention free random access (CFRA) through a PDCCH order, the BS may separately specify a random access preamble ID (RAPID) for CFRA to a specific UE operating in the connected mode. At this time, the BS already recognizes that only the specific UE to which the BS has issued the order will transmit (Msg. 3) PUSCH indicated by the RAR grant corresponding to the RAPID (or Msg. A PUSCH associated with the Msg. A PRACH corresponding to the RAPID). Accordingly, the BS may determine that the specific UE already knows the guard band and RB set configuration information through the guard band configuration information indicated by the BS. Accordingly, the BS does not need to configure that the specific UE is to unnecessarily configure an RB set according to the nominal guard band information. Therefore, the UE instructed to perform CFRA (through the PDCCH order) may transmit the (Msg. 3) PUSCH indicated by the RAR grant corresponding to the RAPID indicated by the BS (or Msg. A PUSCH associated with the Msg. A PRACH corresponding to the RAPID indicated by the BS), determining that the RB set is configured according to the guard band configuration information indicated by the BS. Accordingly, the UE and the BS may operate to transmit and receive Msg. 3 PUSCH (or Msg. A PUSCH) using only the PRB resources in the corresponding RB set based on the RB set in which the guard band is configured.

Additionally, an issue similar to that described above may be raised regarding the PRACH (Msg. 1 preamble or Msg. A PRACH). That is, in relation to the method of Embodiment 5 proposing that the operation should proceed to the next RB set when multiple ROs are allocated in the frequency domain and a specific RO occupies multiple RB sets, the UE and the BS need to exactly identify the starting PRB index of the next RB set. The idle mode UE, which has failed to receive the UE-specific guard band configuration, checks the RB set configuration according to the nominal guard band, while the connected mode UE, which may receive the UE-specific guard band configuration, checks the RB set configuration as indicated by the BS. If the RB set configurations understood by the two UEs are different from each other, the position of the actual RO may also differ between the UEs, raising an issue in terms of BS reception.

Therefore, when Msg. 1 PRACH (or Msg. A PRACH) is transmitted, the UE and the BS may be configured to always determine that the RB set is configured according to the nominal guard band information. Accordingly, the UE and the BS may operate to transmit and receive Msg. 1 PRACH (or Msg. A PRACH) using only the PRB resources in the corresponding RB set based on the RB set in which the nominal guard band is configured. Alternatively, in configures/indicates an RO for transmitting Msg. 1 PRACH (or Msg. A PRACH), the BS may configure the RO, always assuming that the RB set is configured according to the nominal guard band information. With the configuration established in this way, BD is not required when the BS receives the Msg. 1 PRACH (or Msg. A PRACH).

Additionally, the proposed method described above may be equally applied to transmission of PUCCH (i.e., initial PUCCH resource set) through which HARQ ACK of Msg. 4 or Msg. B is transmitted. In other words, when a PUCCH for transmitting HARQ ACK PUCCH of Msg. 4 or HARQ ACK PUCCH of Msg. B is transmitted (namely, when the initial PUCCH resource set is used before a dedicated PUCCH resource set is indicated), the UE and the BS may be configured to always determine that the RB set is configured according to the nominal guard band information.

Accordingly, the UE and the BS may operate to transmit and receive the HARQ ACK PUCCH of Msg. 4 or the HARQ ACK PUCCH of Msg. B using only the PRB resources in the corresponding RB set based on the RB set in which the nominal guard band is configured. Further, with the above method, BD is not required when the BS receives the HARQ ACK PUCCH of Msg. 4 or the HARQ ACK PUCCH of Msg. B.

3.7 Embodiment 7: PO Allocation for 2-Step RACH Procedure in NR-U

When the 2-step RACH procedure is used in NR-U, the BS may configure a PUSCH occasion (PO) using UL resource allocation type 2 (interlaced structure). The BS may configure/indicate multiple FDMed POs using the following methods.

[Proposed Method 7-1] When multiple interlace indexes and multiple RB sets are configured, PO indexing may be performed.

It is assumed that the BWP is composed of K RB sets, and a total of L (unit) interlaces are configured in each RB set (where K and L are natural numbers).

The UE and the BS index a total of {K×L} (unit) interlace resources in the lowest (or highest) index order in the RB interlace index first & RB set index second manner (where m=0, 1, . . . , K×L−1).

As an example, the UE and the BS index {interlace index 0 in RB set index 0} as (unit) interlace index 0, {interlace index 1 in RB set index 0} as (unit) interlace index 1, . . . , {interlace index L−1 in RB set index 0} as (unit) interlace index L−1, {interlace index 0 in RB set index 1} as (unit) interlace index L, { interlace index 1 in RB set index 1} as (unit) interlace index L+1, . . . , and {interlace index L−1 in RB set index K−1} as (unit) interlace index K x L−1.

For the BWP, three parameters, that is, starting (unit) interlace index (or offset) "A", number of (unit) interlaces per PO "B", and number of FDMed POs "C" may be configured for the UE through SIB or RRC.

Accordingly, B adjacent (unit) interlaces (on the (unit) interlace index m) starting from (unit) interlace index m=A may be bundled to form each PO resource. Thereby, a total of C POs (adjacent on the (unit) interlace index m) may be configured.

For example, m=A to A+B−1 may be set to the first PO (PO index 0), m=A+B to A+2B−1 may be set to the second PO (PO index 1), . . . , and m=A+(C−1)×B to A+C×B−1 may be set to the last C-th PO (PO index C−1).

According to the confirmation described above, POs may be configured using all the (unit) interlace indexes for each single RB set length. Accordingly, the number of occasions for transmitting Msg. A PUSCH may be increased, and thus the BS may be configured with ease in RO to PO mapping.

Additionally, the gap between the lowest (unit) interlace index in the RB set to which the starting (unit) interlace index (or offset) "A" configured by the BS belongs (e.g., the first RB set in which the PO resource is configured) and the starting (unit) interlace index (or offset) "A" may be determined as the interlace index offset. In addition, the interlace index offset may be applied even to other RB sets (after the first RB set (index)) (for the (first) PO resource configured in the RB sets).

For example, when a total of 5 (unit) interlace indexes are present in an RB set, A is set to (unit) interlace index 6, and B is set to 2 (unit) interlaces, {interlace index 1/2 in RB set index 1} is set to PO index 0 (in this case, the interlace index offset=1, and therefore the offset is equally applied to RB sets after RB set index 1), {interlace index 3/4 in RB set index 1} is set to PO index 1, {interlace index 1/2 in RB set index 2} is set to PO index 2, and the like.

[Proposed Method 7-2] A single RO may be additionally configured to always be included in a single RB set based on Proposed Method 7-1.

As in Proposed Method 7-1, it is assumed that the BWP is composed of K RB sets and a total of L (unit) interlaces are configured in each of the RB sets (where K and L are natural numbers).

In this case, the UE and the BS index a total of {K×L} (unit) interlace resources in the lowest (or highest) index order in the RB interlace index first & RB set index second manner (where m=0, 1, . . . , K×L−1).

As an example, the UE and the BS index {interlace index 0 in RB set index 0} as (unit) interlace index 0, {interlace index 1 in RB set index 0} as (unit) interlace index 1, . . . , {interlace index L−1 in RB set index 0} as (unit) interlace index L−1, {interlace index 0 in RB set index 1} as (unit) interlace index L, {interlace index 1 in RB set index 1} as (unit) interlace index L+1, . . . , and {interlace index L−1 in RB set index K−1} as (unit) interlace index K×L−1.

In addition, For the BWP, three parameters, that is, starting (unit) interlace index (or offset) "A", number of (unit) interlaces per PO "B", and number of FDMed POs "C" may be configured for the UE through SIB or RRC.

Accordingly, B adjacent (unit) interlaces (on the (unit) interlace index m) starting from (unit) interlace index m=A may be bundled to form each PO resource. Thereby, a total of C POs (adjacent on the (unit) interlace index m) may be configured.

For example, m=A to A+B−1 may be set to the first PO (PO index 0), m=A+B to A+2B−1 may be set to the second PO (PO index 1), . . . , and m=A+(C−1)×B to A+C×B−1 may be set to the last C-th PO (PO index C−1).

Additionally, when one PO is composed of B adjacent (unit) interlaces on (unit) interlace index m, if the corresponding PO resource spans multiple RB sets (e.g., two RB sets having indexes k and k+1), the PO may be composed of B adjacent (unit) interlaces, starting from the first (unit) interlace index of the RB set having the highest frequency or index between the multiple RB sets (RB set index k+1 in the case of the preceding example).

For example, in the configuration of Proposed Method 7-1, when a total of 5 (unit) interlace indexes are present in an RB set, A is set to (unit) interlace index 0, and B is set to 2 (unit) interlaces, {interlace index 0/1 in RB set index 0} is set to PO index 0, {interlace index 2/3 in RB set index 0} is set to PO index 1, {interlace index 4 in RB set index 0 & interlace index 0 in RB set index 1} is set to PO index 2, and the like.

For example, in the configuration of Proposed Method 7-2, when a total of 5 (unit) interlace indexes are present in an RB set, A is set to (unit) interlace index 0, and B is set to 2 (unit) interlaces, {interlace index 0/1 in RB set index 0} may be set to PO index 0, {interlace index 2/3 in RB set index 0} may be set to PO index 1, {interlace index 0/1 in RB set index 1} may be set to PO index 2, and the like.

When configuration is established as described above, all POs may be limited in one RB set, and therefore the probability that the UE will succeed in LBT may be increased.

Additionally, the gap between the lowest (unit) interlace index in the RB set to which the starting (unit) interlace index (or offset) "A" configured by the BS belongs (e.g., the first RB set in which the PO resource is configured) and the starting (unit) interlace index (or offset) "A" may be determined as the interlace index offset. In addition, the interlace index offset may be applied even to other RB sets (after the first RB set (index)) (for the (first) PO resource configured in the RB sets).

For example, a total of 5 (unit) interlace indexes exist in the RB set, A is set to (unit) interlace index 7, and B is set to 2 (unit) interlaces, {interlace index 2/3 in RB set index 1} may be set to PO index 0 (in this case, the interlace index offset=2, and therefore the offset is equally applied to RB sets after RB set index 1), {interlace index 2/3 in RB set index 2} may be set to PO index 1, {interlace index 2/3 in RB set index 3} may be set to PO index 2, and the like.

Implementation Examples

Figure 17:
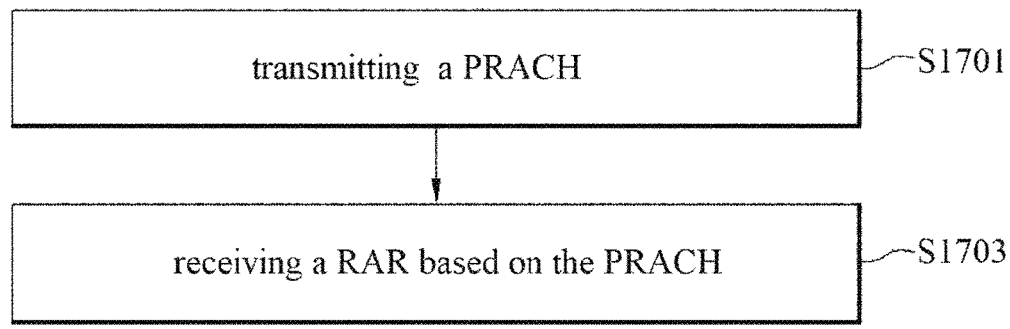

FIG. 17 is a flowchart of a signal transmission/reception method according to embodiments of the present disclosure.

Referring to FIG. 17, embodiments of the present disclosure may be carried out by a UE and may include transmitting a PRACH (S1701) and receiving an RAR based on the PRACH (S1703). Although not shown, an embodiment of the present disclosure carried out from the perspective of a BS may include receiving a PRACH and transmitting an RAR based on the PRACH.

The PRACH may be included in Msg. 1 for a 4-step RACH procedure. In addition, the PRACH may be included in Msg. A for a 2-step RACH procedure.

The RAR may be included in Msg. 2 for the 4-step RACH procedure. In addition, the RAR may be included in Msg. B for the 2-step RACH procedure. The RAR may be an RAR related to failure of Msg. A PUSCH transmission in the 2-step RACH procedure.

The PRACH may be transmitted on a specific RACH occasion (RO) among a plurality of ROs. In addition, the PRACH may be transmitted on some specific ROs among the plurality of ROs.

The plurality of ROs may be configured by a combination of one or more of the methods described in Embodiments 1 to 7.

For example, when the plurality of ROs is configured based on Embodiment 5, the ROs may be included in uplink RB sets, respectively, one for each of the uplink RB sets. In addition, the uplink RB sets may be included in one uplink active BWP. In other words, one uplink active BWP may include a plurality of RB sets, and a guard band (or guard PRB) may be present between the RB sets. Also, each of the RB sets may include one RO. Accordingly, the number of RB sets and the number of ROs are the same in one uplink active BWP.

As a more specific example, when a plurality of ROs is configured based on Opt 5-1-3 of Proposed Method 5-1, the starting RB index of a specific RO included in the plurality of ROs may be determined based on (i) the lowest RB index of the RB set including the specific RO, (ii) the starting RB index of the RO positioned at the lowest frequency, and (iii) the lowest RB index of the RB set including the RO positioned at the lowest frequency.

More specifically, the value of the starting RB index of the specific RO is obtained by adding the value of the lowest RB index of the RB set including the specific RO and an offset value. The offset value may be obtained by subtracting the value of the lowest RB index of the RB set including the RO positioned at the lowest frequency from the value of the starting RB index of the RO positioned at the lowest frequency.

The starting RB index of each of all the plurality of ROs including the specific RO may be determined based on (i) the lowest RB index of each RB set including each RO, (ii) the starting RB index of the RO positioned at the lowest frequency, and (iii) the lowest RB index of the RB set including the RO positioned at the lowest frequency.

After the RAR is received, the PUSCH included in Msg. 3 may be transmitted. Alternatively, Msg. A PUSCH included in the same Msg. A as the PRACH may be transmitted. A PO on which Msg. A PUSCH is transmitted may also be configured by a combination of one or more of the methods described in Embodiments 1 to 7.

Regarding the guard band positioned between the RB sets, the guard band may be configured based on Embodiment 6.

For example, according to Embodiment 6, even when UE-specific guard band information for each uplink RB set is received, the plurality of ROs may be configured on a basis that each uplink RB set is configured based on nominal guard band information.

Even when UE-specific guard band information for each uplink RB set is received, the plurality of POs may be configured on a basis that each uplink RB set is configured based on the nominal guard band information. A PUCCH including HARQ ACK transmitted by the UE in response to reception of Msg. 4 may be configured on a basis that each uplink RB set is configured based on the nominal guard band information even when the UE-specific guard band information for each uplink RB set is received.

The methods of Opt 5-1-3 and Embodiment 6 may be carried out in combination with each other or may be carried out independently. The operations of Embodiments 1 to 7 may also be performed in combination with each other or may be performed independently.

In addition to the operations described with reference to FIG. 17, one or more of the operations described with reference to FIGS. 1 to 16 and/or the operations described in Embodiments 1 to 7 may be combined and additionally performed. For example, the UE may perform uplink LBT before transmission of the PRACH.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 18:
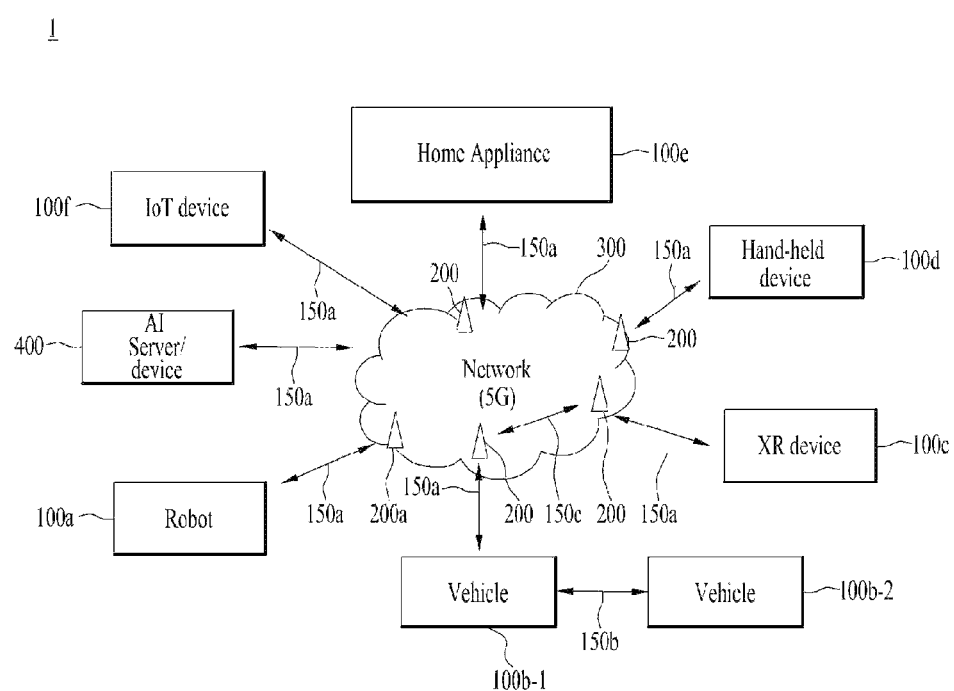
FIGS. 18 to 21 illustrate devices according to an embodiment of the present disclosure.

FIG. 18 illustrates a communication system 1 applied to the present disclosure.

Referring to FIG. 18, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g., V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g., relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and received on various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

Figure 19:
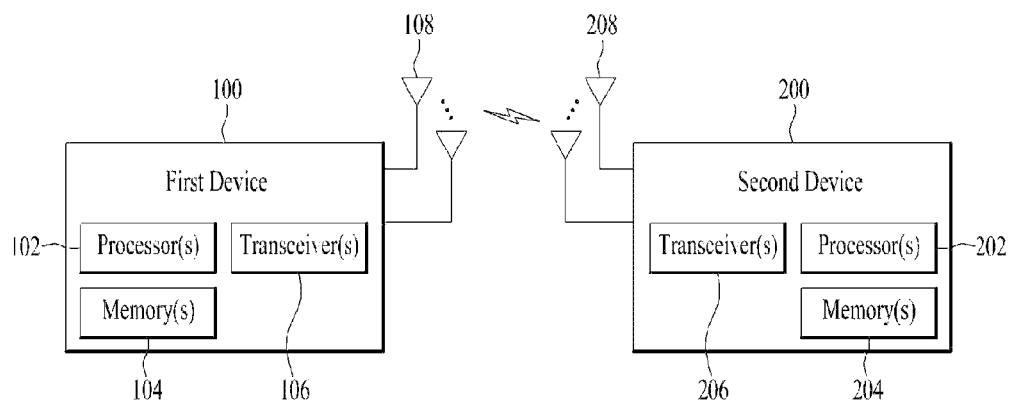

FIG. 19 illustrates wireless devices applicable to the present disclosure.

Referring to FIG. 19, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

Figure 20:
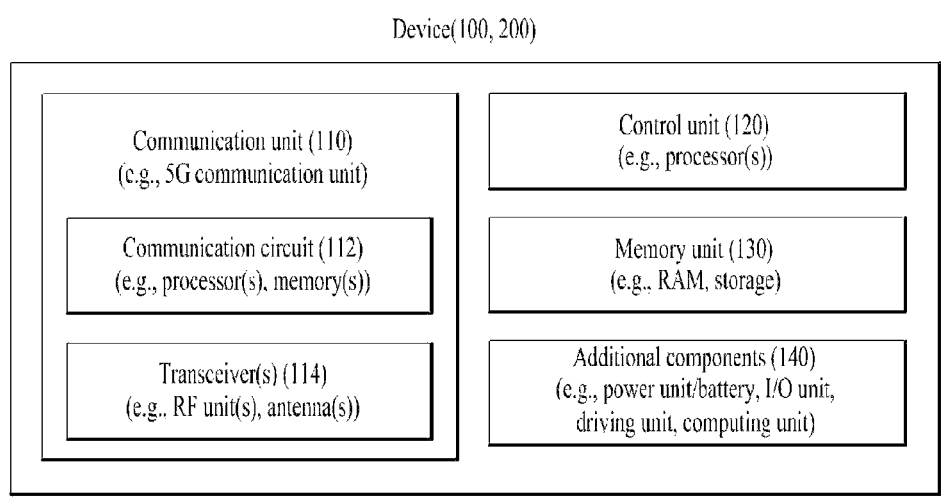

FIG. 20 illustrates another example of a wireless device applied to the present disclosure. The wireless device may be implemented in various forms according to a use case/service (refer to FIG. 18).

Referring to FIG. 20, wireless devices 100 and 200 may correspond to the wireless devices 100 and 200 of FIG. 19 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcasting terminal, a hologram device, a public safety device, an MTC device, a medical device, a FinTech device (or a finance device), a security device, a climate/environment device, the A1 server/device (400 of FIG. 18), the BSs (200 of FIG. 18), a network node, or the like. The wireless device may be mobile or fixed according to a use case/service.

In FIG. 20, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 21:
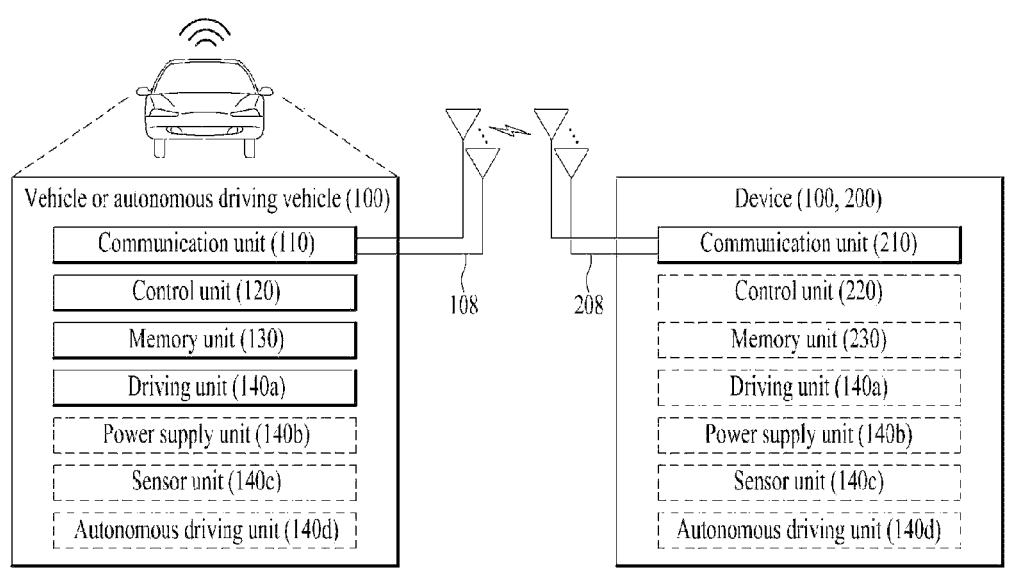

Example of Vehicle or Autonomous Driving Vehicle to which the Present Disclosure is Applied FIG. 21 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 21, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As described above, the present disclosure is applicable to various wireless communication systems.

What is claimed is:

1. A method performed by a user equipment (UE) configured to operate in a wireless communication system, the method comprising:

transmitting a physical random access channel (PRACH); and receiving a random access response (RAR) in response to the PRACH, wherein the PRACH is transmitted on a specific random access channel (RACH) occasion (RO) among a plurality of ROs, wherein a starting frequency position of the specific RO in a frequency domain is determined by the UE based on:

(i) a lowest resource block (RB) index of a first RB set, among RB sets, comprising the specific RO,
(ii) an RB-level frequency offset for a starting RB of an RO positioned at a lowest frequency among the plurality of ROs, and
(iii) a lowest RB index of a second RB set, among the RB sets, comprising the RO positioned at the lowest frequency,
wherein the RB sets are included in one uplink bandwidth part (BWP),
wherein each RB set included in the RB sets is a contiguous set of RBs in a shared spectrum, and
wherein a channel access procedure for the shared spectrum is performed in an RB set included in the RB sets.

2. The method of claim 1, wherein the plurality of ROs is included in the RB sets, respectively, one for each of the RB sets.

3. The method of claim 2, wherein the uplink BWP comprises an intra-cell guard RB.

4. The method of claim 2, wherein a number of the ROs and a number of the RB sets are configured independently.

5. A user equipment (UE) configured to operate in a wireless communication system, the UE comprising:
at least one transceiver;
at least one processor; and
at least one memory operatively coupled to the at least one processor and storing instructions that, when executed, cause the at least one processor to perform specific operations,
wherein the specific operations comprise:
transmitting a physical random access channel (PRACH); and
receiving a random access response (RAR) in response to the PRACH,
wherein the PRACH is transmitted on a specific random access channel (RACH) occasion (RO) among a plurality of ROs,
wherein a starting frequency position of the specific RO in a frequency domain is determined by the UE based on:
(i) a lowest resource block (RB) index of a first RB set, among RB sets, comprising the specific RO,
(ii) an RB-level frequency offset for a starting RB of an RO positioned at a lowest frequency among the plurality of ROs, and
(iii) a lowest RB index of a second RB set, among the RB sets, comprising the RO positioned at the lowest frequency,
wherein the RB sets are included in one uplink bandwidth part (BWP),
wherein each RB set included in the RB sets is a contiguous set of RBs in a shared spectrum, and
wherein a channel access procedure for the shared spectrum is performed in an RB set included in the RB sets.

6. The UE of claim 5, wherein the plurality of ROs is included in the RB sets, respectively, one for each of the RB sets.

7. The UE of claim 6, wherein the uplink BWP comprises an intra-cell guard RB.

8. The UE of claim 6, wherein a number of the ROs and a number of the RB sets are configured independently.

9. A method performed by a base station configured to operate in a wireless communication system, the method comprising:
receiving a physical random access channel (PRACH); and
transmitting a random access response (RAR) in response to the PRACH,
wherein the PRACH is received on a specific RACH occasion (RO) among a plurality of ROs,
wherein a starting frequency position of the specific RO in a frequency domain is determined by the base station based on:
(i) a lowest resource block (RB) index of a first RB set, among RB sets, comprising the specific RO,
(ii) an RB-level frequency offset for a starting RB of an RO positioned at a lowest frequency among the plurality of ROs, and
(iii) a lowest RB index of a second RB set, among the RB sets, comprising the RO positioned at the lowest frequency,
wherein the RB sets are included in one uplink bandwidth part (BWP),
wherein each RB set included in the RB sets is a contiguous set of RBs in a shared spectrum, and
wherein a channel access procedure for the shared spectrum is performed in an RB set included in the RB sets.

10. The method of claim 9, wherein the plurality of ROs is included in the RB sets, respectively, one for each of the RB sets.

11. The method of claim 10, wherein the uplink BWP comprises an intra-cell guard RB.

12. The method of claim 10, wherein a number of the ROs and a number of the RB sets are configured independently.

13. A base station configured to operate in a wireless communication system, the base station comprising:
at least one transceiver;
at least one processor; and
at least one memory operatively coupled to the at least one processor and storing instructions that, when executed, cause the at least one processor to perform specific operations,
wherein the specific operations comprise:
receiving a physical random access channel (PRACH); and
transmitting a random access response (RAR) in response to the PRACH,
wherein the PRACH is received on a specific RACH occasion (RO) among a plurality of ROs,
wherein a starting frequency position of the specific RO in a frequency domain is determined by the base station based on:
(i) a lowest resource block (RB) index of a first RB set, among RB sets, comprising the specific RO,
(ii) an RB-level frequency offset for a starting RB of an RO positioned at a lowest frequency among the plurality of ROs, and
(iii) a lowest RB index of a second RB set, among the RB sets, comprising the RO positioned at the lowest frequency,
wherein the RB sets are included in one uplink bandwidth part (BWP),
wherein each RB set included in the RB sets is a contiguous set of RBs in a shared spectrum, and
wherein a channel access procedure for the shared spectrum is performed in an RB set included in the RB sets.

14. The base station of claim 13, wherein the plurality of ROs is included in the RB sets, respectively, one for each of the RB sets.

15. The base station of claim 14, wherein the uplink BWP comprises an intra-cell guard RB.

16. The base station of claim 14, wherein a number of the ROs and a number of the RB sets are configured independently.

\* \* \* \* \*